(12) United States Patent
Ju et al.

(10) Patent No.: US 10,028,637 B2
(45) Date of Patent: Jul. 24, 2018

(54) DISHWASHER

(71) Applicant: LG ELECTRONICS INC., Seoul (KR)

(72) Inventors: Byeonghyeon Ju, Seoul (KR); Jongmin Lee, Seoul (KR); Youmin Lee, Seoul (KR); Heeyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/804,968

(22) Filed: Jul. 21, 2015

(65) Prior Publication Data
US 2016/0015240 A1    Jan. 21, 2016

(30) Foreign Application Priority Data

Jul. 21, 2014  (KR) .................. 10-2014-0092097
Aug. 22, 2014  (KR) .................. 10-2014-0109907

(51) Int. Cl.
*A47L 15/44*    (2006.01)
*A47L 15/42*    (2006.01)
(Continued)

(52) U.S. Cl.
CPC ....... *A47L 15/4229* (2013.01); *A47L 15/0055* (2013.01); *A47L 15/4436* (2013.01); *A47L 15/4242* (2013.01); *A47L 2301/04* (2013.01); *A47L 2401/023* (2013.01); *A47L 2401/11* (2013.01); *A47L 2501/16* (2013.01); *A47L 2501/26* (2013.01); *A47L 2501/265* (2013.01); *C02F 1/32* (2013.01); *C02F 5/10* (2013.01);
(Continued)

(58) Field of Classification Search
CPC ............. A47L 15/4229; A47L 15/4231; A47L 15/0055; A47L 15/4436
USPC ...................................... 134/57 D
See application file for complete search history.

(56) References Cited

U.S. PATENT DOCUMENTS 4,845,965 A    7/1989  Copeland et al.
6,823,878 B1   11/2004 Gadini
(Continued)

FOREIGN PATENT DOCUMENTS

CN    1973750 A    6/2007
CN    1973751 A    6/2007
(Continued)

*Primary Examiner* — Joseph L. Perrin
*Assistant Examiner* — Kevin G Lee
(74) *Attorney, Agent, or Firm* — Dentons US LLP

(57) ABSTRACT

A dishwasher includes: a tub which defines a space in which dishes are washed; a sump which accommodates washing water to be supplied into the tub; and a descaling solution supply device which supplies a descaling solution to the sump, in which the descaling solution supply device includes: a main flow path which guides washing water to be supplied to the sump; a solution accommodating unit which accommodates a descaling agent and has a solution outlet through which washing water, in which the descaling agent is dissolved, is discharged to the main flow path; a solution discharge valve which opens and closes the solution outlet; and a branch flow path which branches off from the main flow path, supplies the washing water into the solution accommodating unit, and has an atmosphere communicating port that communicates with the atmosphere.

29 Claims, 19 Drawing Sheets

(51) Int. Cl.
*A47L 15/00* (2006.01)
*C02F 5/10* (2006.01)
*C02F 1/32* (2006.01)
*D06F 39/02* (2006.01)
*D06F 33/02* (2006.01)
*D06F 35/00* (2006.01)

(52) U.S. Cl.
CPC ...... *C02F 2303/22* (2013.01); *C02F 2307/12* (2013.01); *D06F 33/02* (2013.01); *D06F 35/008* (2013.01); *D06F 39/02* (2013.01); *D06F 2204/02* (2013.01)

(56) References Cited

U.S. PATENT DOCUMENTS

| | | | | |
|---|---|---|---|---|
| 2008/0110479 | A1* | 5/2008 | Veening | A47L 15/0049 134/113 |
| 2008/0264778 | A1* | 10/2008 | Joshi | A61L 2/035 204/232 |
| 2010/0297206 | A1* | 11/2010 | Kim | A01N 59/10 424/409 |
| 2014/0053875 | A1* | 2/2014 | Anim-Mensah | B08B 9/093 134/22.18 |
| 2015/0059809 | A1* | 3/2015 | Petri | A47L 15/4229 134/22.11 |
| 2015/0068565 | A1* | 3/2015 | Lee | C02F 5/00 134/56 D |

FOREIGN PATENT DOCUMENTS

| | | | |
|---|---|---|---|
| CN | 201607645 U | 10/2010 | |
| DE | 3303161 A1 | 8/1984 | |
| DE | 19704805 A1 | 8/1998 | |
| DE | 202015007584 U1 * | 2/2016 | ............... C02F 1/42 |
| EP | 0205788 A1 | 12/1986 | |
| EP | 0860140 A2 | 8/1998 | |
| EP | 2623013 A1 | 8/2013 | |
| EP | 2345759 B1 * | 3/2014 | ............. D06F 39/02 |
| JP | 51038380 U1 | 3/1976 | |
| JP | 2000-210243 A | 8/2000 | |
| JP | 4133780 B2 | 8/2008 | |
| JP | 2009-155615 A | 7/2009 | |
| KR | 20-0237846 Y1 | 10/2001 | |
| KR | 10-2005-0112739 A | 12/2005 | |
| KR | 10-2007-0114228 A | 11/2007 | |
| KR | 10-2008-0012568 A | 2/2008 | |
| KR | 10-1117245 B1 | 3/2012 | |
| KR | 10-1212950 B1 | 1/2013 | |
| WO | 03/087460 A1 | 10/2003 | |

* cited by examiner

DISHWASHER

CROSS-REFERENCE TO RELATED APPLICATION

This application claims priority to Korean Patent Application No. 10-2014-0092097, filed on Jul. 21, 2014 and No. 10-2014-0109907, filed on Aug. 22, 2014 in the Korean Intellectual Property Office, all of which are incorporated by reference in their entirety for all purposes as if fully set forth herein.

BACKGROUND

1. Field of the Disclosure

The present disclosure relates to a washing machine.

2. Background

A washing machine is an apparatus that washes contaminated objects using water. As a washing machine, there are a laundry washing machine (typically called a laundry machine) for washing laundry such as clothes or bedding, and a dishwasher for washing dishes and/or pots and pans.

Washing water having hardness of 60 ppm or more is generally called hard water, and when the hard water is heated, scale is inevitably formed. Since most of the washing machines perform a process of heating the washing water, there may be various problems due to accumulation of scale in a case in which hard water is not appropriately processed.

An appropriate amount of descaling agent needs to be supplied in order to remove the scale formed in the washing machine, but because a significant amount of formed scale is discharged from the dishwasher together with drained water, the amount of descaling agent, which is actually required, is very small. A required amount of descaling agent needs to be accurately input because there may occur a problem with product reliability when an excessive amount of descaling agent is supplied, and performance in removing scale may deteriorate when a very small amount of descaling agent is supplied. However, it is difficult and very inconvenient for a user to accurately measure a required amount of descaling agent.

Meanwhile, the descaling agent, which remains on the objects that are completely washed, may cause problems when the descaling agent has a component hazardous to humans. Particularly, in a case in which the object to be washed is necessarily and often used in contact with humans, the problem becomes severe because the component of the remaining descaling agent has an adverse effect on health of a human. Therefore, a descaling agent harmless to humans needs to be used in a case in which there is likelihood that the descaling agent remaining on the objects to be washed (laundry, dishes, etc.) in the laundry machine or the dishwasher will be absorbed by humans.

SUMMARY OF THE DISCLOSURE

The present invention has been made to provide a dishwasher which has a function of preventing formation of scale and removing formed scale.

The present invention has also been made to provide a dishwasher capable of quantitatively supplying a descaling agent.

The present invention has also been made to provide a dishwasher capable of quantitatively supplying a descaling solution even though pressure of washing water being supplied to the dishwasher is changed.

The present invention has also been made to provide a dishwasher which supplies a descaling solution made of a material harmless to humans.

The present invention has also been made to provide a washing machine which inputs organic acid harmless to humans as a descaling agent.

The present invention has also been made to provide a washing machine capable of automatically inputting organic acid.

The present invention has also been made to provide a washing machine which inputs organic acid harmless to humans as a descaling agent.

The present invention has also been made to provide a washing machine capable of automatically inputting organic acid.

An exemplary embodiment of the present invention includes a dishwasher comprising: a tub including a space in which dishes are washed; a sump to contain washing water to be supplied into the tub; and a descaling solution supply device to supply a descaling solution to the sump, in which the descaling solution supply device includes: a main flow path to guide washing water to be supplied to the sump; a solution accommodating unit to contain a descaling agent including a solution outlet through which washing water, in which the descaling agent is dissolved, is discharged to the main flow path; a solution discharge valve to open and close the solution outlet; and a branch flow path which branches off from the main flow path, supplies the washing water into the solution accommodating unit, and includes an atmosphere communicating port that communicates with the atmosphere.

The branch flow path may include: an upstream side branch flow path which guides washing water flowing upward from the main flow path; and a downstream side branch flow path which guides the washing water guided downward along the upstream side branch flow path, and wherein a water level in the downstream side branch flow path may be restricted to a predetermined height by atmospheric pressure applied through the atmosphere communicating port. The dishwasher may further include an intermediate flow path through which the washing water discharged from the upstream side branch flow path passes in the process of flowing into the downstream side branch flow path, in which the atmosphere communicating port is formed in the intermediate flow path. The dishwasher may further include a water supply device to supply the washing water to the main flow path, in which the atmosphere communicating port communicates with the atmosphere through the water supply device.

The atmosphere communicating port may be exposed to the atmosphere while the washing water flows into the solution accommodating unit.

An area of an outlet of the upstream side branch flow path may be smaller than an area of an inlet of the downstream side branch flow path. The area of the outlet of the upstream side branch flow path may be equal to or smaller than 1/10 of the area of the inlet of the downstream side branch flow path.

The washing water outlet may be positioned at a position lower than a height to which a water level in the downstream side branch flow path is restricted.

The main flow path may include a solution merging path to guide the washing water downward and then guide the washing water upward.

The solution outlet may be in the solution merging path. A water level in the tub may be restricted to be below a height to which a water level in the downstream side branch flow path is restricted. An outlet, through which the washing water is discharged, may be in the tub at a position below the height to which the water level in the downstream side branch flow path is restricted.

The descaling solution supply device may include: an accommodating unit main body including the solution accommodating unit and the main flow path; and a main body cover coupled to the accommodating unit main body and forms the branch flow path. The solution accommodating unit may be open at an upper side thereof, and the main body cover may cover the upper side of the solution accommodating unit. The accommodating unit main body and the main body cover may be separably coupled to each other.

A washing water inlet through which the washing water flows into the main flow path may be included in the main body cover.

A descaling agent input opening, which communicates with the solution accommodating unit, may be included in the main body cover, and a stopper may be opens and closes the descaling agent input opening.

The dishwasher may further include a residual quantity detecting sensor to detect a quantity of residual descaling agents in the solution accommodating unit. The residual quantity detecting sensor may detect a change in concentration of the descaling solution.

The dishwasher may further include: an information device; and a controller which determines when to supplement the descaling agent based on a value detected by the residual quantity detecting sensor, and controls the information device to display that it is time to supplement the descaling agent. The dishwasher may further include: a partition which divides the inside of the solution accommodating unit into a space into which the descaling agent is input and a space in which the residual quantity detecting sensor is disposed, in which the partition has a through hole which allows the washing water to flow between the two spaces.

The descaling agent may include organic acid in the form of particles or powder. The organic acid may include one or more kinds of acid selected from a group consisting of citric acid, malic acid, tartaric acid, acetic acid, lactic acid, and formic acid.

The dishwasher may further include a sterilizing device to sterilize washing water accommodated in the solution accommodating unit. The sterilizing device may discharge antimicrobial materials into washing water.

The sterilizing device may emit ultraviolet rays into washing water.

The dishwasher may further include a controller which controls the solution discharge valve. The controller may control the solution discharge valve so that the solution discharge valve is opened based on the number of cycles performed including a series of processes.

The controller may control the solution discharge valve so that the solution discharge valve is opened each time a cycle including a series of processes is carried out.

The dishwasher may further include: an input unit to receive a predetermined course for inputting the descaling agent that is selected by a user; and a controller to control the solution discharge valve so that when the predetermined course is selected by using the input unit, the solution discharge valve is opened while the predetermined course is carried out. The input unit may provide the predetermined course separately from a washing course and a rinsing course.

The dishwasher may further include: a hardness sensor to detect hardness of washing water being supplied from an external water source to the descaling solution supply device; and a controller to set an amount of organic acid, which is input through the descaling agent supply device, based on a value detected by the hardness sensor.

BRIEF DESCRIPTION OF THE DRAWINGS

The embodiments will be described in detail with reference to the following drawings in which like reference numerals refer to like elements wherein.

DETAILED DESCRIPTION

Advantages, features and methods for achieving those of embodiments may become apparent upon referring to embodiments described later in detail together with attached drawings. However, embodiments are not limited to the embodiments disclosed hereinafter, but may be embodied in different modes. The embodiments are provided for perfection of disclosure and informing a scope to persons skilled in this field of art. The same reference numbers may refer to the same elements throughout the specification.

Figure 1:
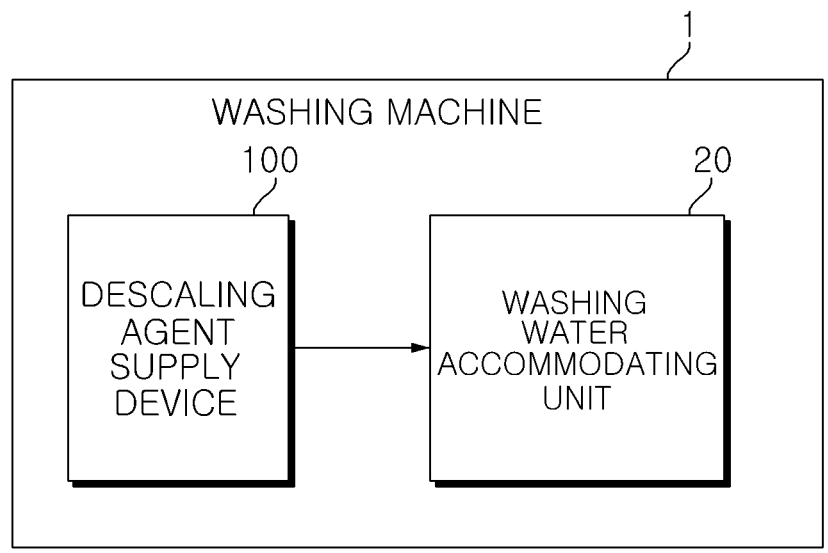
FIGS. 1 and 2 are block diagrams illustrating a configuration of a washing machine according to an exemplary embodiment of the present invention.
Figure 2:
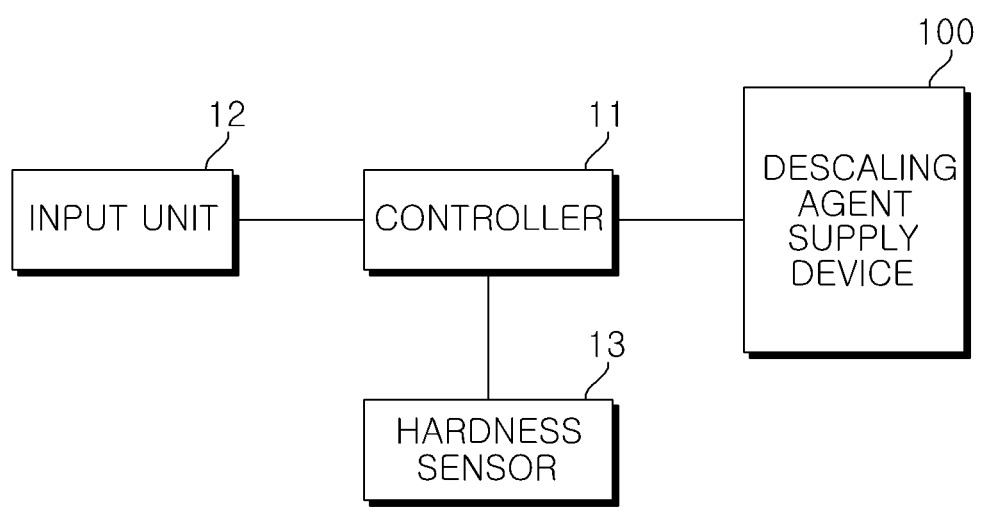

FIGS. 1 and 2 are block diagrams illustrating a configuration of a washing machine 1 according to an exemplary embodiment of the present invention. Referring to FIGS. 1 and 2, the washing machine 1 according to the exemplary embodiment is an apparatus for washing contaminated objects to be washed using washing water. The washing machine may include a washing water accommodating unit 20 which accommodates washing water supplied for washing the objects to be washed, and a descaling agent supply device 100 which discharges a descaling agent to the washing water to be supplied into the washing water accommodating unit 20.

The descaling agent supply device 100 may discharge the descaling agent in the form of particles or a liquid, or a solution in which the descaling agent is dissolved in accordance with exemplary embodiments. The descaling agent is discharged in a state of being dissolved in the washing water, and hereinafter, the descaling agent is defined as a material that bonds with metal ions (e.g., $Ca^{2+}$, $Mg^{2+}$) in hard water and inhibits formations of scale or removes formed scale, and a solution in which the descaling agent is dissolved is defined as a descaling solution.

The descaling agent includes acid compositions, for example, chemicals such as organic acid including hydrochloric acid, citric acid, malic acid, tartaric acid, acetic acid, lactic acid, and formic acid, phosphoric acid, and sulfamic acid which react with alkaline carbonate and the like in the scale. The chemicals in a liquid phase as well as in a solid phase such as powder or particles may be accommodated in a descaling device. Particularly, the organic acid such as the citric acid is an environmentally-friendly material harmless to humans.

Particularly, the organic acid has an ability to bond with metal ions (e.g., $Ca^{2+}$, $Mg^{2+}$) in hard water so as to inhibit formation of scale or remove formed scale. Therefore, by supplying the organic acid through the descaling agent supply device 100 at an appropriate point of time, it is possible to prevent components, which are often in contact with washing water, such as, for example, a washing water accommodating unit 20, 20b, or 20c, (see FIGS. 3, 5, 6, and 21), and a washing space 20a or 22 (see FIGS. 5 and 21), which accommodates the object to be washed, from being contaminated by scale.

The descaling agent supply device 100 may input one or more kinds of organic acid selected from a group consisting of citric acid, malic acid, tartaric acid, acetic acid, lactic acid, and formic acid. The organic acid is not only known as a material harmless to humans, but also proven to have a descaling effect even though a tiny amount of organic acid is used.

The descaling agent supply device 100 may include a solution accommodating unit which accommodates the descaling agent such as the organic acid, and a solution discharge valve which adjusts the amount of descaling solution discharged from the solution accommodating unit. Hereinafter, the solution discharge valve may be opened and closed by being controlled by a controller 11, illustrated in FIG. 2. The solution discharge valve may be configured as a solenoid valve.

Meanwhile, in a case in which the descaling agent includes organic acid, the organic acid may be input in the form of a liquid, considering that the organic acid has an excellent descaling ability even though a tiny amount of organic acid is used, it is advantageous to input the organic acid in a state of being dissolved in advance in order to uniformly distribute the organic acid in the washing water, and the organic acid needs to be easily and quantitatively input.

As further illustrated in FIG. 2, the washing machine 1 may include an input unit 12 which receives various types of commands from a user, the controller 11 which controls overall operations of the washing machine 1, and/or a hardness sensor 13 which detects hardness of the washing water.

The input unit 12 may have various input means such as buttons, dials, and touchpads so as to receive, from the user, commands for setting various types of courses such as a washing course, and a rinsing course, or commands for setting a point of time at which the organic acid is input through the descaling agent supply device 100.

The controller 11 may control the discharge means in accordance with the setting input through the input unit 12 so that the discharge means is opened at a set point of time at which the organic acid is input.

In accordance with exemplary embodiments, the solution discharge valve may be controlled by the controller 11 based on hardness of the washing water which is detected by the hardness sensor 13. The hardness sensor 13 may detect hardness of the washing water being supplied from an external water source such as a faucet. In this case, the hardness is detected in a state in which no detergent is input into the washing water. As a value of the hardness detected by the hardness sensor 13 is increased, the controller 11 may increase an opening frequency or an opening time of the solution discharge valve.

Characteristics of the hardness of the washing water supplied to the washing machine 1 are determined according to locations where the washing machine 1 is installed, and are substantially constant as long as the washing machine 1 is not installed at other locations or treatment of the input water has not changed. The washing machine 1 may provide a particular function of setting the amount of descaling agent to be supplied each time the descaling agent is supplied using the input unit 12. In this case, in a case in which hardness of the washing water at the location where the washing machine 1 is installed is detected when the washing machine 1 is installed, and the amount of descaling agent to be supplied is set based on the detected value of hardness by using the input unit 12, it is not necessary to substantially change the amount of descaling agent to be supplied except for a special situation such as movement of the washing machine 1.

The setting of the amount of descaling agent to be supplied using the input unit 12 may be carried out in advance by a manufacturer in consideration of characteristics of the location where the washing machine 1 is sold before the product is shipped.

The input of the descaling agent through the descaling agent supply device 100 may be carried out each cycle of the washing machine 1. A typical fully automatic washing machine automatically performs a series of processes such as a washing process, a rinsing process, a drying process, and a spin-drying process in accordance with the setting of the input unit 12. In a case in which the series of processes constitute a single cycle, the controller 11 may control the solution discharge valve so that the solution discharge valve is opened each cycle.

Otherwise, the input of the descaling agent through the descaling agent supply device 100 may be carried out based on the number of cycles performed. The washing machine 1 may include a counter that counts the number of cycles performed. When the number of cycles performed counted by the counter reaches a predetermined number, the controller 11 may control the solution discharge valve so that the solution discharge valve is opened while the cycle of which the number of cycles performed reaches the predetermined number is carried out. After the descaling agent is supplied by the descaling agent supply device 100, the counter is initialized, the number of cycles performed is counted again, and the organic acid is repeatedly input each time the number of cycles performed reaches the predetermined number.

In another manner, the input of the descaling agent through the descaling agent supply device 100 may be carried out when a predetermined course is input through the input unit 12. The input unit 12 may provide a predetermined course (hereinafter, referred to as a descaling course) in which the descaling agent is supplied to remove or inhibit scale. When the descaling course is selected, the controller 11 may control the solution discharge valve so that the solution discharge valve is opened while the descaling course is carried out. The predetermined course may be provided separately from the washing course or the rinsing course.

Meanwhile, a single cycle may include a series of processes including a prewashing process, a main washing process, a rinsing process, and/or a heating and rinsing process. The controller 11 may control the solution discharge valve 130 so that the solution discharge valve 130 is opened while the processes are carried out. In this case, the opening time of the solution discharge valve may be controlled differently in accordance with the process that is being carried out.

In several exemplary embodiments as described above, the supply of the descaling agent through the descaling agent supply device 100 may be quantitatively controlled so that a constant amount of descaling agent is input each time the descaling agent is needed, and to this end, the controller 11 may control the opening time of the solution discharge valve based on a predetermined time.

Hereinafter, an example of the descaling agent supply device 100, which may quantitatively input the descaling agent, will be described with reference to FIG. 3.

Figure 3:
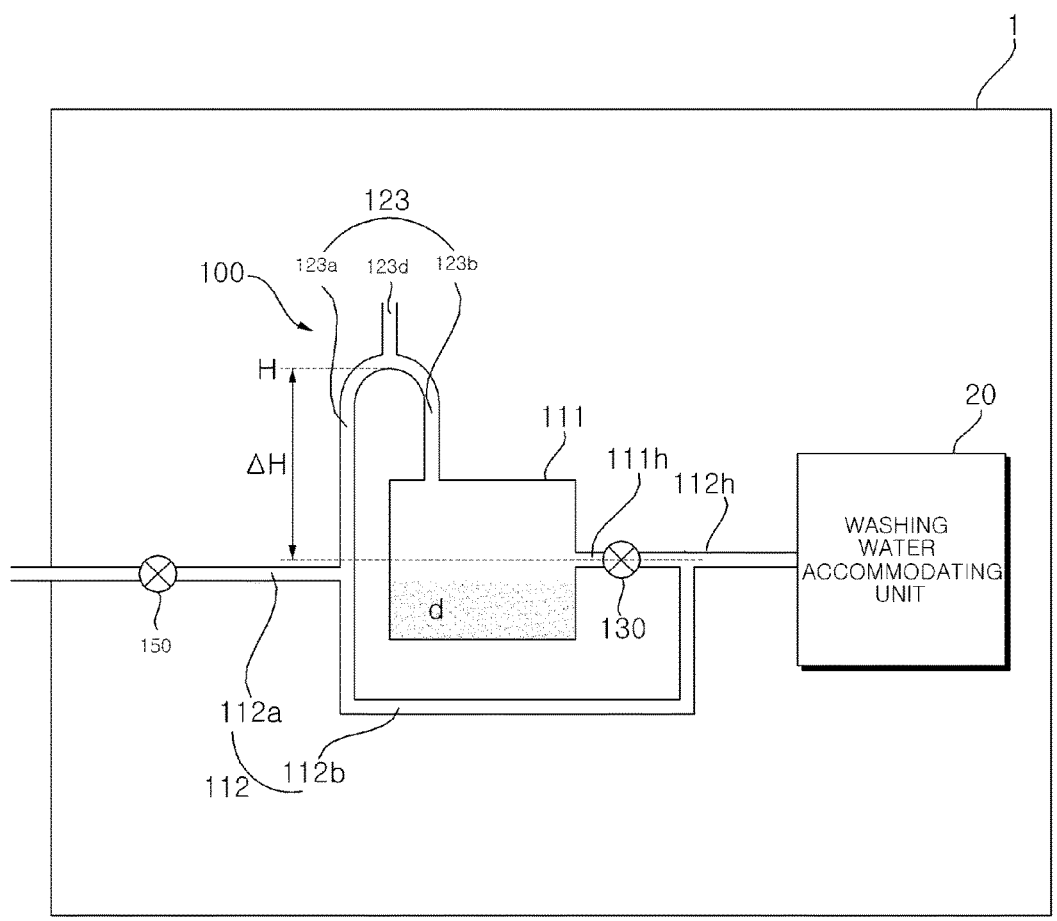
FIG. 3 illustrates an exemplary embodiment in which a configuration of a descaling agent supply device illustrated in FIGS. 1 and 2 is specified.

FIG. 3 illustrates the washing water accommodating unit 20 which accommodates the washing water, and the descaling agent supply device 100 which inputs the descaling solution into the washing water accommodating unit 20. The descaling agent supply device 100 includes a solution accommodating unit 111 which accommodates a descaling agent d, a main flow path 112 which guides the washing water to the washing water accommodating unit 20 during a process of supplying the washing water so that the washing water bypasses the solution accommodating unit 111, and a branch flow path 123 which branches off from the main flow path 112, and guides the washing water, which is guided along the main flow path 112, to the solution accommodating unit 111. A water supply valve 150 may be provided to control supplying of washing water along the main flow path 112.

The main flow path 112 may be divided into an upstream side main flow path 112a positioned at an upstream side and a downstream side main flow path 112b positioned at a downstream side, based on a portion where the main flow path 112 is connected with an inlet of the branch flow path 123.

The descaling agent in the form of powder or particles may be input into the solution accommodating unit 111. Hereinafter, for example, the descaling agent is an organic acid.

In the solution accommodating unit 111, the overall amount of organic acid is not dissolved in the washing water, but only a part of the organic acid is dissolved, and the remaining part of the organic acid is present in a precipitated state. That is, the washing water in the solution accommodating unit 111 is maintained in a saturated or supersaturated state for a sufficient time until the organic acid is consumed and the washing water becomes an unsaturated state.

The number of times at which the solution discharge valve 130 is opened to supply the organic acid may be set so that the organic acid may be input roughly 4,000 to 5,000 times until the washing water in the solution accommodating unit 111 becomes an unsaturated state.

The solution accommodating unit 111 has a solution outlet 111h through which an organic acid solution produced in the solution accommodating unit 111 is discharged, and the solution discharge valve 130 opens and closes the solution outlet 111h. The solution outlet 111h is maintained in a closed state by the solution discharge valve 130 during the process of supplying the washing water.

The main flow path 112 communicates with the washing water accommodating unit 20 through a washing water outlet path 112h and supplies washing water to the washing water accommodating unit 20 therethrough.

The branch flow path 123 includes an atmosphere communicating port 123d which is positioned above the solution outlet 111h and communicates with the atmosphere. The atmosphere communicating port 123d may communicate with the atmosphere even while the washing water is supplied into the solution accommodating unit 111. Because atmospheric pressure is applied through the atmosphere communicating port 123d, the water head is constantly maintained at a downstream side 123b of the atmosphere communicating port 123d on the branch flow path 123 even though the supply of the washing water is shut off in a state in which the solution accommodating unit 111 is filled with the washing water. Particularly, because the supply of the washing water into the washing water accommodating unit 20 is carried out in a state in which the solution outlet 111h is closed, and a substantially constant atmospheric pressure is applied to the atmosphere communicating port 123d, the washing water in the branch flow path 123 maintains a constant head difference with respect to the solution outlet 111h when the supply of the washing water is shut off. As a result, the organic acid solution may be quantitatively discharged from the solution accommodating unit 111 when the solution discharge valve 130 is opened. Particularly, because a water level in the branch flow path 123 is constantly maintained with respect to the solution outlet 111h, the organic acid may be quantitatively discharged through the solution outlet 111h even though water supply pressure varies in accordance with characteristics of locations where the washing machine 1 is used.

Meanwhile, when the solution accommodating unit 111 is filled with the washing water supplied through the branch flow path 123 in a state in which the solution outlet 111h is closed by the solution discharge valve 130, the washing water does not flow into the solution accommodating unit 111, but is discharged through the atmosphere communicating port 123d. Thereafter, when the supply of the washing water is shut off, the amount of washing water exceeding a maximum water level H in the downstream side branch flow path 123b and the amount of washing water remaining in the upstream side branch flow path 123a, of the overall amount of washing water in the branch flow path 123, are moved downward by its own weight and flow into the washing water accommodating unit 20 along the main flow path 112.

When the supply of the washing water is shut off in a state in which the solution accommodating unit 111 is filled with the washing water, the water level H in the downstream side branch flow path 123b is constantly set, and the water level maintains a constant head difference ΔH with respect to the solution outlet 111h, such that the water level is defined as a head difference maintaining water level H. The water level in the tub 20a may be maintained to be the head difference maintaining water level H or lower.

Meanwhile, in the exemplary embodiment, the branch flow path 123 has the atmosphere communicating port 123d formed at the uppermost end of the flow path, and based on the atmosphere communicating port 123d, the upstream side branch flow path 123a guides the washing water upward, and the downstream side branch flow path 123b guides the washing water downward, but the present embodiment is not necessarily limited thereto. The position of the atmosphere communicating port 123d may be changed as necessary within a range in which the water level in the downstream side branch flow path 123b maintains a constant head difference with respect to the solution outlet 111h.

Figure 4:
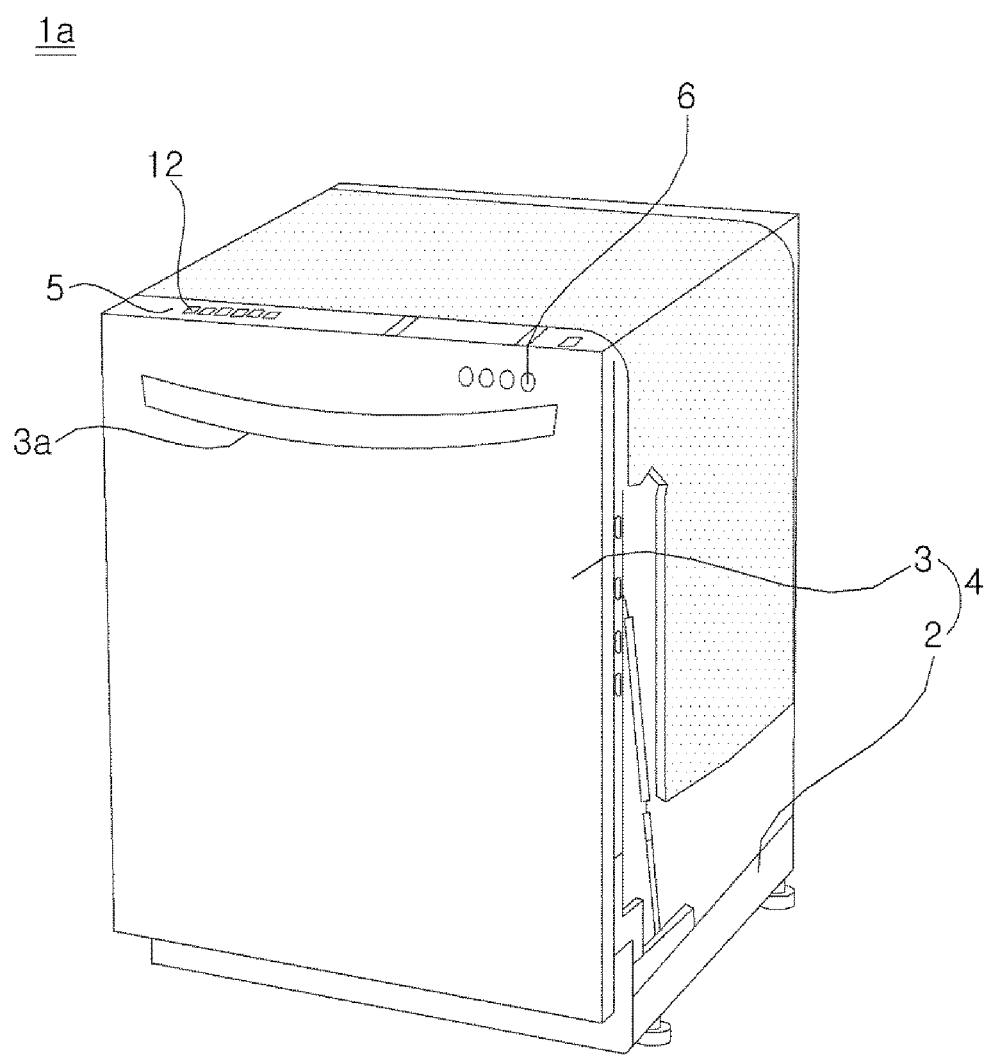
FIG. 4 is a perspective view illustrating a dishwasher as an example of the washing machine according to an embodiment.
Figure 5:
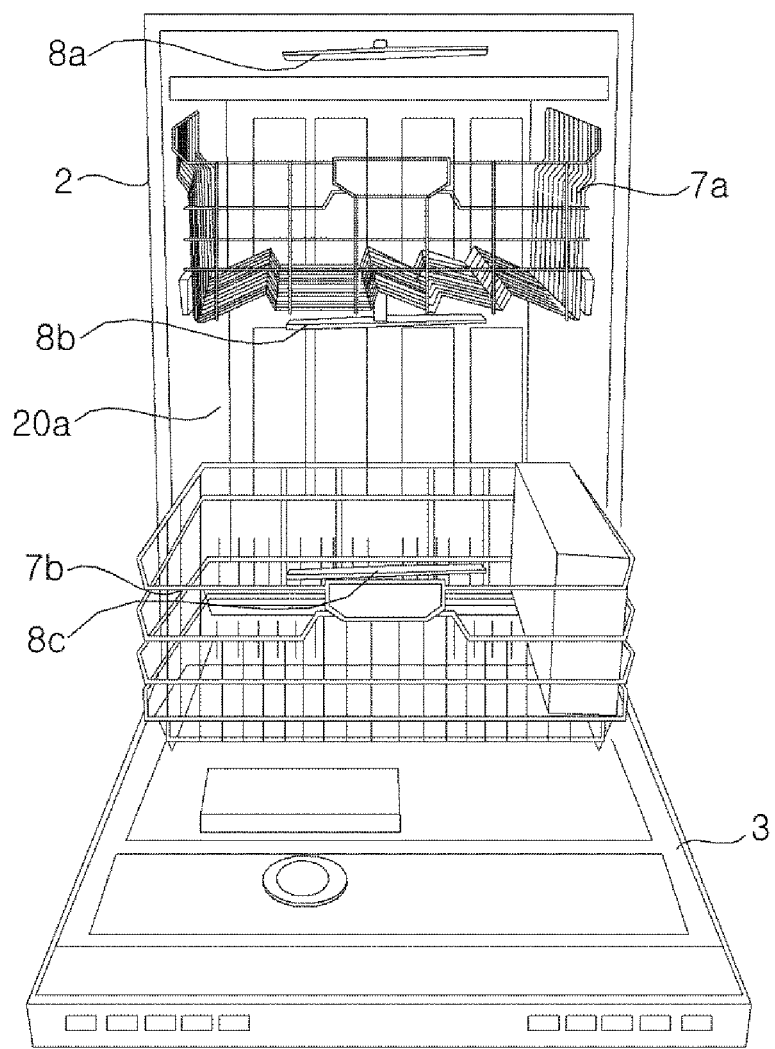
FIG. 5 is a view illustrating a state in which a door of the dishwasher in FIG. 4 is opened.
Figure 6:
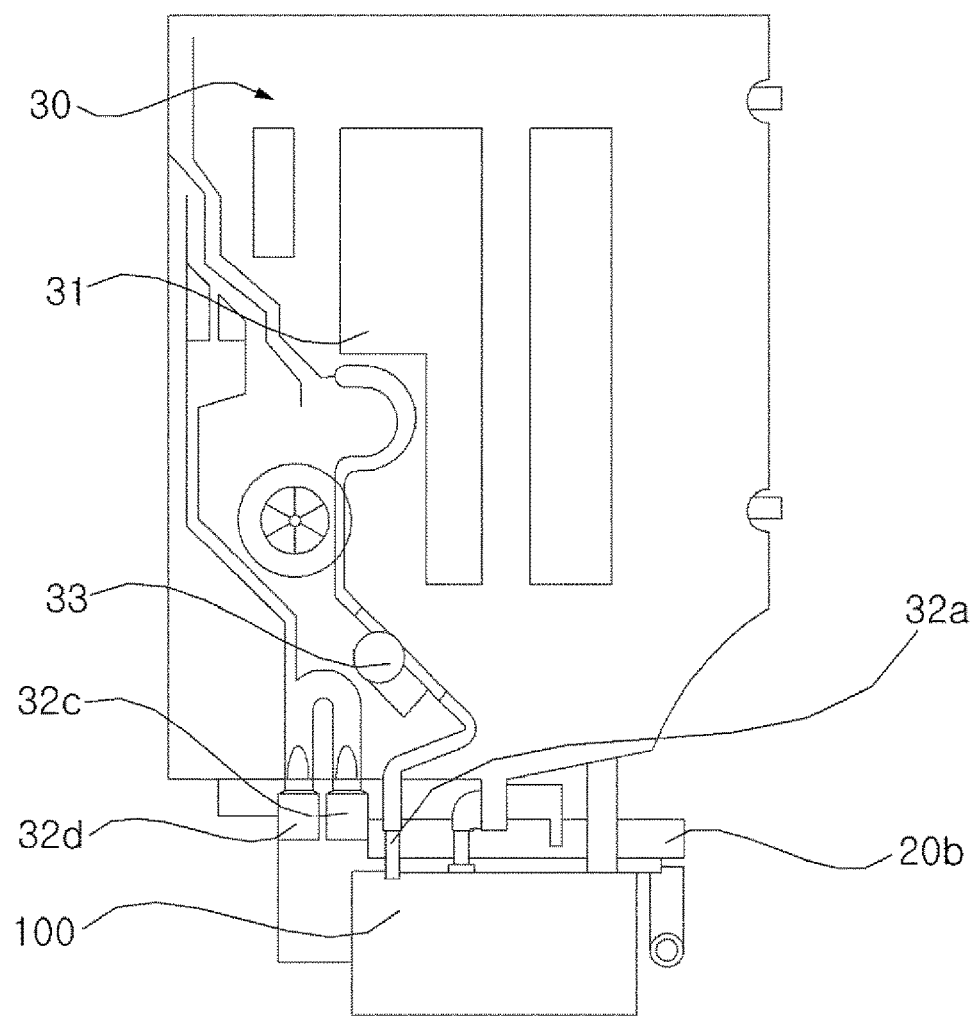
FIG. 6 is a view illustrating details of the dishwasher in FIG. 4.

FIG. 4 is a perspective view illustrating a dishwasher 1a as an example of the washing machine according to the present disclosure. FIG. 5 is a view illustrating a state in which a door of the dishwasher 1a in FIG. 4 is opened. FIG. 6 is a view illustrating a configuration of the dishwasher 1a in FIG. 4.

Referring to FIGS. 4 to 6, the dishwasher 1a includes a washing water accommodating unit 20 (not shown, but see FIGS. 1 to 3) which accommodates washing water for washing dishes, and a descaling agent supply device 100 (not shown, but see FIGS. 1 to 3) which discharges a descaling agent into the washing water.

In addition, the dishwasher 1a may include a tub 20a which provides a space in which the dishes are washed, and a sump 20b in which the washing water, which will be supplied into the tub 20a, is collected. The washing water in the sump 20b undergoes a circulation process in which the washing water is sprayed into the tub 20a through nozzles 8a, 8b, and 8c when a washing pump (not illustrated) is operated, the tub 20a is then filled with the sprayed washing water, and then the washing water is collected back to the sump 20b. Therefore, since the tub 20a and the sump 20b are filled with the washing water that is used to wash the dishes, the washing water accommodating unit 20 is defined as including at least one of the tub 20a and the sump 20b.

As illustrated in FIG. 4, a casing 4 may include a cabinet 2 having a dish entrance opening, and a door 3 for opening and closing the dish entrance opening. A handle 3a, a control panel 5 for controlling an operation of the dishwasher, and a display 6 for displaying an operating state of the dishwasher may be provided on the door 3. The control panel 5 may be provided with the input unit 12.

In the tub 20a, as illustrated in FIG. 5, there are provided racks 7a and 7b on which the dishes are placed, and the nozzles which are supplied with the washing water from the sump 20b and spray the washing water to the dishes placed on the racks 7a and 7b. The number of racks 7a and 7b may be one or more, and in the present exemplary embodiment, an upper rack 7a is shown, and a lower rack 7b is below the upper rack 7a. In addition, the number of nozzles 8a, 8b, and 8c may be more than one so that the washing water is sprayed in various directions, and the nozzles 8a, 8b, and 8c may include an upper nozzle 8a which sprays the washing water downward toward the upper rack 7a, an intermediate nozzle 8b which is between the upper rack 7a and the lower rack 7b and sprays the washing water downward toward the lower rack 7b, and a lower nozzle 8c which is below the lower rack 7b and sprays the washing water upward. Although not illustrated, guide flow paths, which guide the washing water from the sump 20b to the respective nozzles, may be provided corresponding to the configurations of the nozzles, and a flow path switching unit (not illustrated), which selectively intermits the guide flow paths, may be further provided. There may be further provided a washing pump (not illustrated) which pumps the washing water collected in the sump 20b to the guide flow path, and a heater (not illustrated) which heats the washing water in the sump 20b.

Referring to FIG. 6, the dishwasher 1a may include a water supply device 30 which supplies washing water to the sump 20b. The water supply device 30 may be between the tub 20a and the cabinet 2. The water supply device 30 may include flow paths which guide a flow of the washing water, water chambers which receive the washing water guided by the flow paths, a water supply hose connector 32a which is connected with a water supply hose into which raw water (e.g., tap water) flows, a flowmeter 33 which detects the amount of raw water flowing into the water supply hose connector 32a, a water chamber 31 which stores the washing water flowing therein, and a vent opening (not illustrated) which communicates the flow paths with the atmosphere in order to prevent siphonage in which the raw water consistently flows in even though the water supply is shut off.

As illustrated in FIG. 3, the solution accommodating unit 111 may be provided independently of the water supply device 30, or may be configured as water chambers formed in the water supply device 30 in accordance with exemplary embodiments. In this case, the water chamber has the solution outlet 111h, and the branch flow path 123 is connected with the water chamber. The descaling agent supply device 100 may discharge the organic acid to a flow path of washing water which is provided in the water supply device 30.

In another exemplary embodiment, a descaling solution discharged from the descaling agent supply device 100 may be input directly into the tub 20a without passing through the sump 20b.

The water supply device 30 may further include a sump drain connector 32c which is connected with a sump drain flow path (not illustrated) along which the washing water used to wash the dishes is guided and drained from the sump 20b, and a drain pump inlet connector 32d which is connected with a drain pump inlet flow path (not illustrated) that guides the washing water flowing into the drain pump.

The washing pump may include a washing water guide (not illustrated) which guides the washing water in the sump 20b to the nozzles 8a, 8b, and 8c, an impeller which is rotatably provided in the washing water guide, and a washing motor which rotates the impeller.

A water supply valve (not illustrated), which intermits supply of washing water to the sump 20b, may be further provided. According to exemplary embodiments, the water supply valve may be configured to intermit discharge of washing water from the water supply device 30 in a case in which the washing water is supplied to the sump 20b from the water supply device 30, or configured to intermit supply of washing water from an external water source in a case in which the washing water is supplied directly to the sump 20b from the external water source. Operations of the water supply valve, the washing motor and the like are controlled by the controller 11.

The sump 20b and the tub 20a are in communication with each other, such that the washing water sprayed by the nozzles 8*a*, 8*b*, and 8*c* flows back into the sump 20*b* from the tub 20*a*. Furthermore, the tub 20*a* is also in communication with a washing water outlet path 112*h* of the descaling solution supply device 100 through the sump 20*b*, and as a result, water pressure applied in a washing water outlet path 112*h* varies according to a water level in the tub 20*a*.

In addition, a filter (not illustrated) may be located in the sump 20*b*, and in this case, the washing water, which has been sprayed into the tub 20*a* through the nozzles 8*a*, 8*b*, and 8*c*, is filtered while passing through the filter, and then flows back into the sump 20*b*.

In addition, the dishwasher 1*a* may include an additive inputting mechanism which inputs a detergent or a rinse into the washing water, and the additive inputting mechanism inputs the detergent for washing dishes or the rinse for rinsing dishes into the tub 20*a* at a predetermined step during a washing process or a rinsing process.

Figure 7:
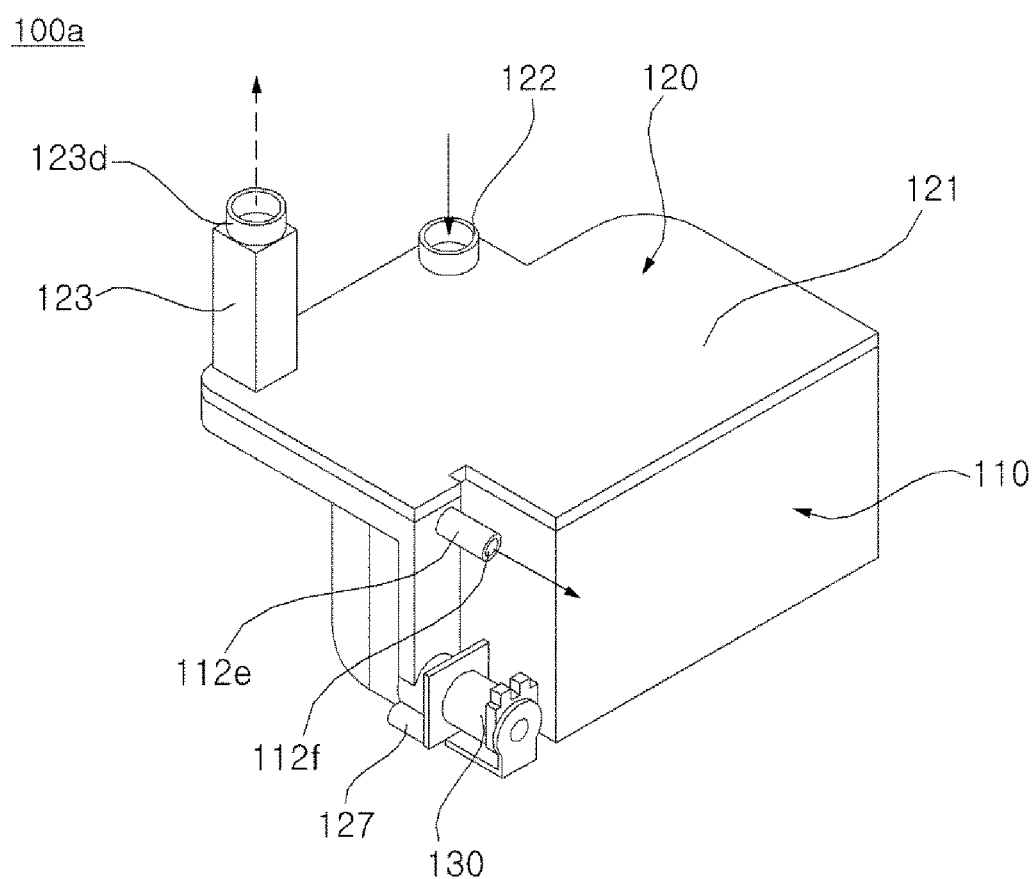
FIG. 7 is a perspective view illustrating a descaling solution supply device illustrated in FIG. 6.
Figure 8:
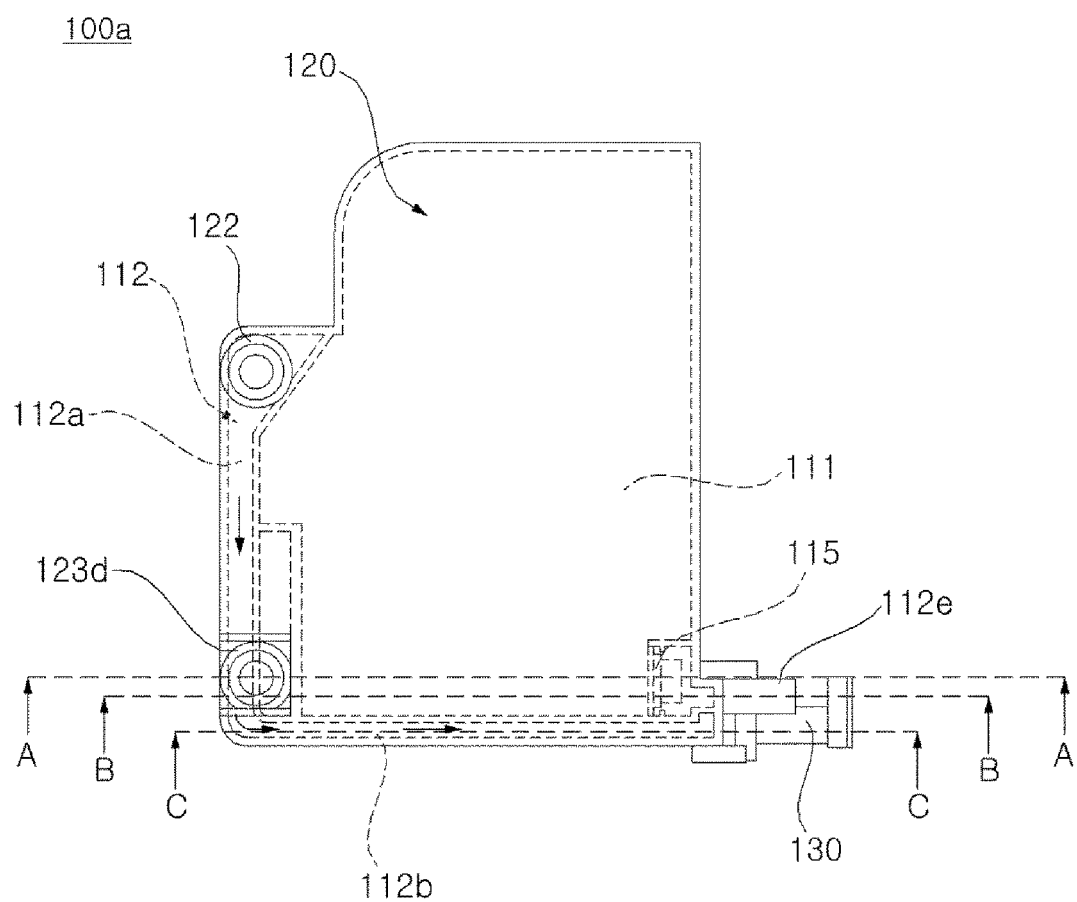
FIG. 8 is a top plan view of the descaling solution supply device illustrated in FIG. 7.
Figure 9:
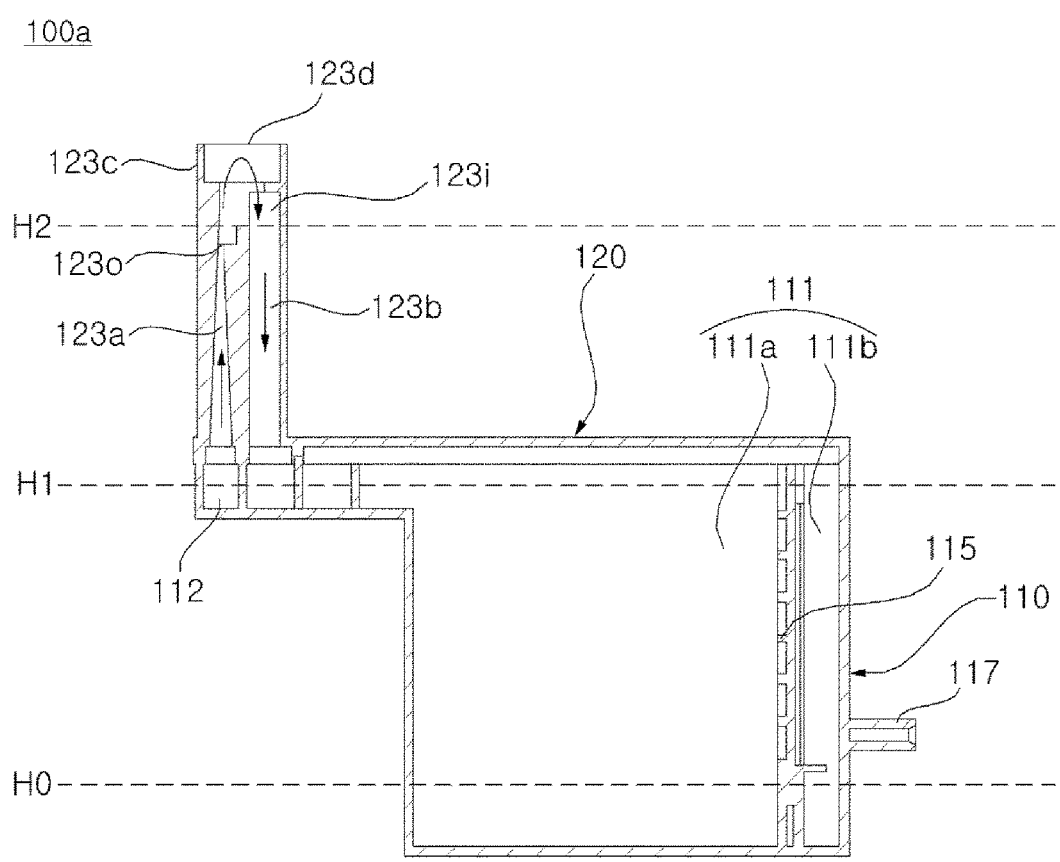
FIG. 9 is a cross-sectional view taken along line A-A of FIG. 8.
Figure 10:
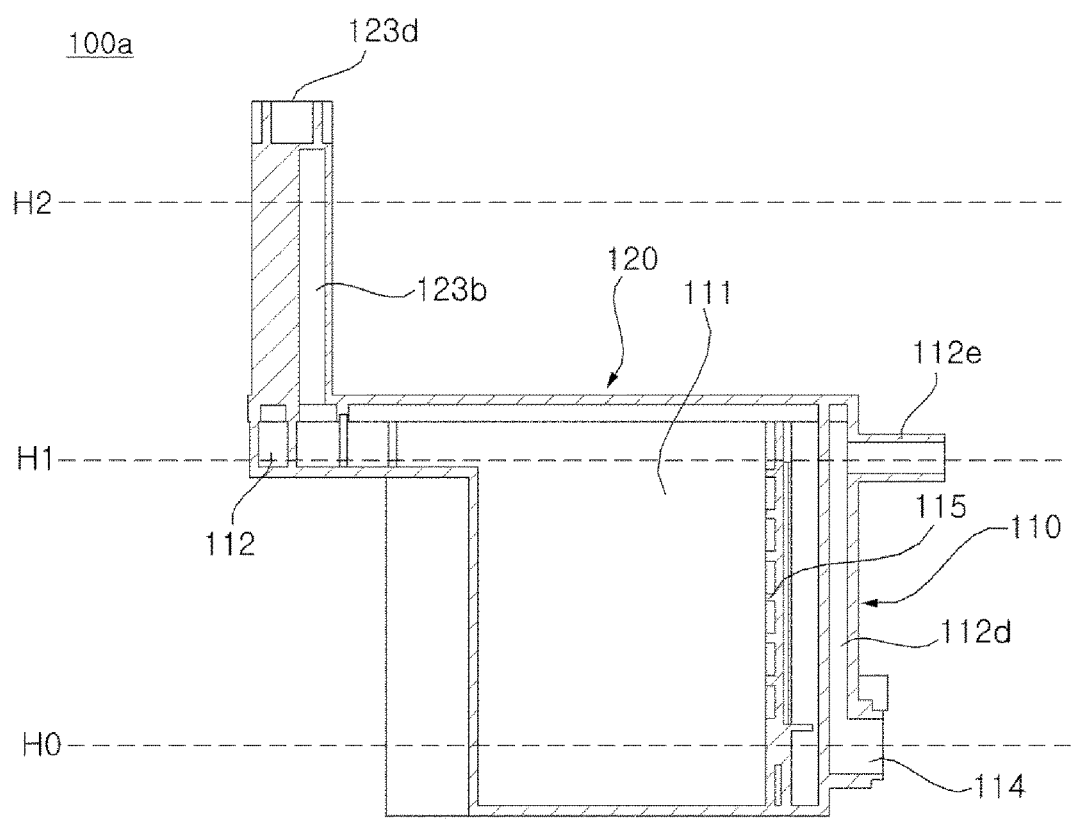
FIG. 10 is a cross-sectional view taken along line B-B of FIG. 8.
Figure 11:
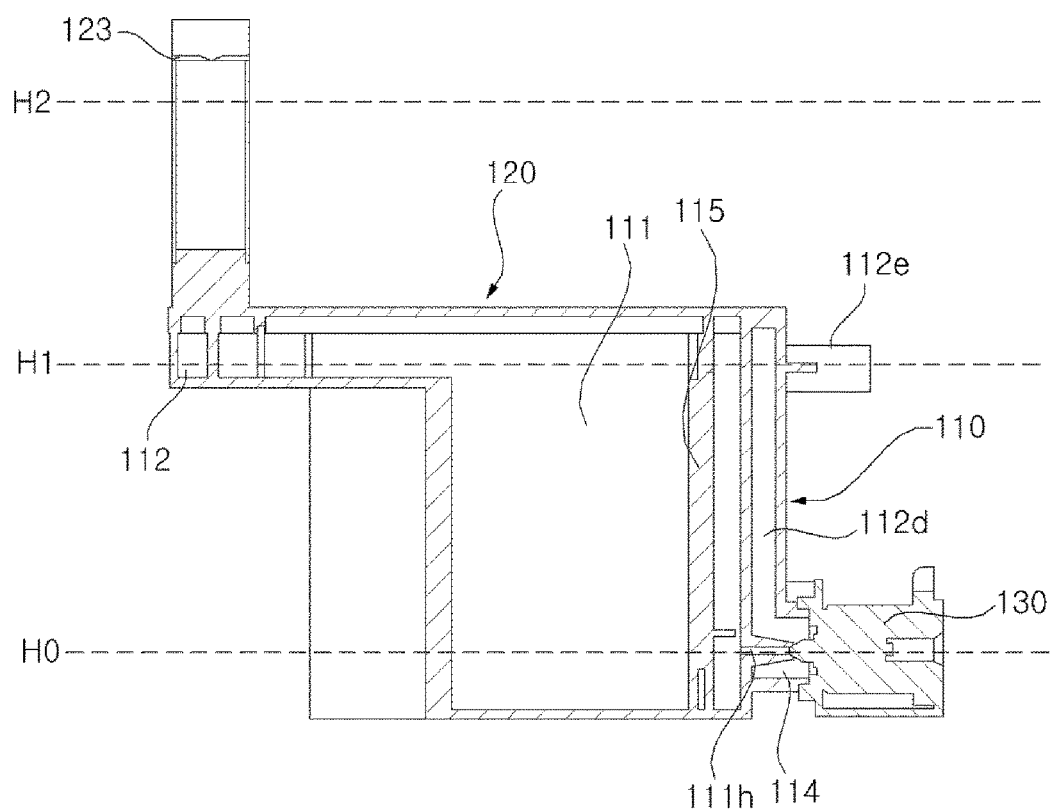
FIG. 11 is a cross-sectional view taken along line C-C of FIG. 8.
Figure 12:
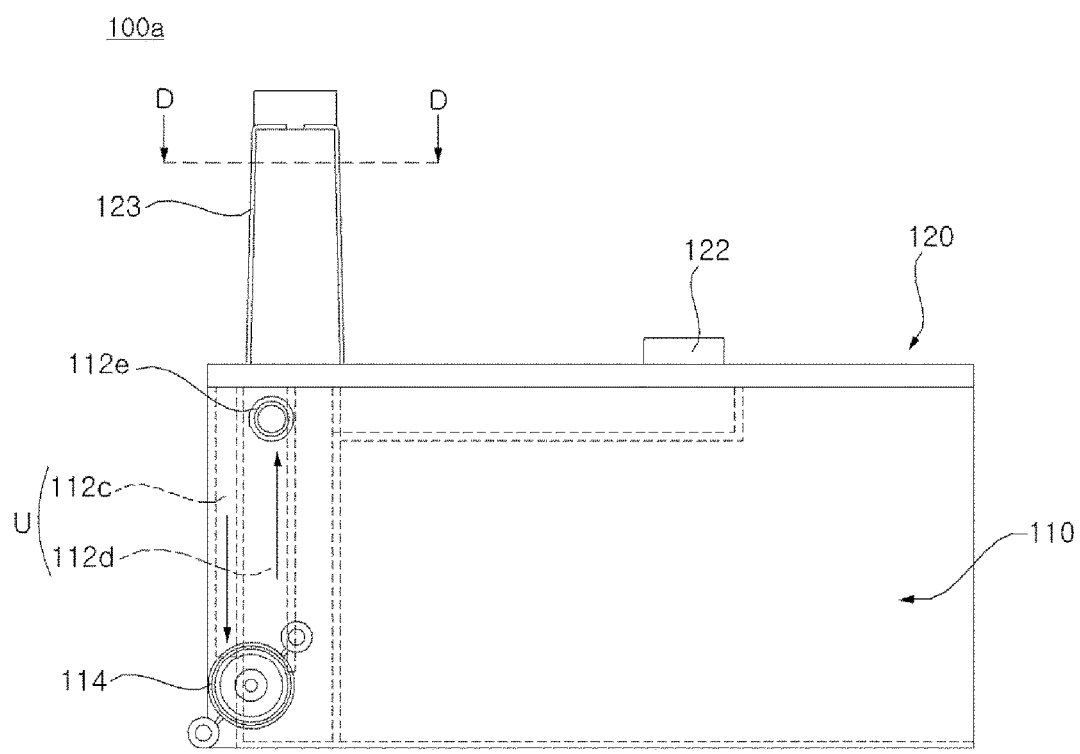
FIG. 12 is a side view illustrating a merging path of the descaling solution supply device.
Figure 13:
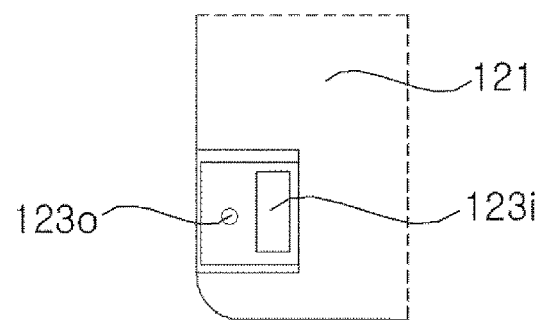
FIG. 13 is a partial cross-sectional view taken along line D-D of FIG. 12.

FIG. 7 is a perspective view illustrating a descaling solution supply device 100*a* according to another exemplary embodiment of the present invention. FIG. 8 is a top plan view of the descaling solution supply device 100*a* illustrated in FIG. 7. FIG. 9 is a cross-sectional view taken along line A-A of FIG. 8. FIG. 10 is a cross-sectional view taken along line B-B of FIG. 8. FIG. 11 is a cross-sectional view taken along line C-C of FIG. 8. FIG. 12 is a side view illustrating a configuration of a merging path U of the descaling solution supply device 100*b*. FIG. 13 is a partial cross-sectional view taken along line D-D of FIG. 12. Hereinafter, the descaling solution supply device 100*a* according to another exemplary embodiment of the present invention will be specifically described with reference to the drawings.

The descaling solution supply device 100*a* includes a solution accommodating unit 111 which accommodates a descaling agent, a main flow path 112 which guides washing water to a sump 20*b* during a process of supplying the washing water so that the washing water bypasses the solution accommodating unit 111, and a branch flow path 123 which branches off from the main flow path 112 and guides the washing water, which is guided along the main flow path 112, to the solution accommodating unit 111.

Illustrated in FIG. 8, the main flow path 112 may be divided into an upstream side main flow path 112*a* positioned at an upstream side and a downstream side main flow path 112*b* positioned at a downstream side, based on a portion where the main flow path 112 is connected with an inlet of the branch flow path 123. According to the aforementioned definition, the solution merging path U, which will be described below, is included in the downstream side main flow path 112*b*.

The solution accommodating unit 111 has a solution outlet 111*h* (shown in FIG. 11) through which the descaling solution produced in the solution accommodating unit 111 is discharged. A solution discharge valve 130 may be further provided to open and close the solution outlet 111*h*. The solution outlet 111*h* is maintained in a closed state by the solution discharge valve 130 during the process of supplying the washing water. A supporters 117 and 127 (shown in FIG. 7 and FIG. 9) for installing the solution discharge valve 130 may be formed on an accommodating unit main body 110. The solution discharge valve 130 may be a solenoid valve that is operated by being controlled by a controller 11.

As illustrated in FIG. 9, the solution accommodating unit 111 may be divided into a first accommodating unit 111*a* and a second accommodating unit 111*b* by a partition 115. The descaling agent is input into the first accommodating unit 111*a*, and the partition 115 may have a plurality of through holes (not illustrated) so as to allow washing water to flow between the first accommodating unit 111*a* and the second accommodating unit 111*b*. In a case in which a descaling agent in the form of powder or particles is input into the first accommodating unit 111*a*, the solution inside of the solution accommodating unit 111 is in a saturated or supersaturated state in which the inputted descaling agent is partially dissolved. In this case, the dissolved components of the descaling agent are diffused into the second accommodating unit 111*b* through the through holes, but precipitates, which are not dissolved, are inhibited by the partition 115 from being moved to the second accommodating unit 111*b*. The solution outlet 111*h* may communicate the second accommodating unit 111*b* with the main flow path 112, and in this case, the descaling agent, which is not dissolved, is prevented from being discharged through the solution outlet 111*h*.

The dishwasher 1*a* may further include a residual quantity detecting sensor (not illustrated) which detects the quantity of residual descaling agents in the solution accommodating unit 111. The residual quantity detecting sensor may be configured as a sensor that detects a change in concentration of the descaling solution. The residual quantity detecting sensor may be disposed in the second accommodating unit 111*b*. The dishwasher may include a controller (not illustrated) that controls various types of components such as the solution discharge valve 130, the washing pump, and the drain pump. The controller may determine when to supplement the descaling agent based on a value detected by the residual quantity detecting sensor, and may display that it is time to supplement the descaling agent, through an information device such as a display 4 and/or an alarm (not illustrated), to alert a user.

The branch flow path 123 includes an atmosphere communicating port 123*d* which is positioned above the solution outlet 111*h* and communicates with the atmosphere. The atmosphere communicating port 123*d* may communicate with the atmosphere even while the washing water is supplied into the solution accommodating unit 111. Because atmospheric pressure is applied through the atmosphere communicating port 123*d*, the water head is constantly maintained at a downstream side 123*b* of the atmosphere communicating port 123*d* on the branch flow path 123 even though the supply of washing water is shut off in a state in which the solution accommodating unit 111 is filled with the washing water. Particularly, because the supply of washing water to the sump 20*b* is carried out in a state in which the solution outlet 111*h* is closed, and a substantially constant atmospheric pressure is applied to the atmosphere communicating port 121*d*, the washing water in the branch flow path 123 maintains a constant head difference with respect to the solution outlet 111*h* when the supply of washing water is shut off, and as a result, the descaling solution may be quantitatively discharged from the solution accommodating unit 111 when the solution discharge valve 130 is opened. Particularly, because a water level in the branch flow path 123 is constantly maintained with respect to the solution outlet 111*h*, the descaling solution may be quantitatively discharged through the solution outlet 111*h* even though water supply pressure varies in accordance with characteristics of locations where the dishwasher is used.

The descaling solution supply device 100*a* may include the accommodating unit main body 110 which constitutes the solution accommodating unit 111, and a main body cover 120 which has a washing water inlet 122 into which washing water to be supplied into the solution accommodating unit 111 flows. In order to easily input and supplement the descaling agent, the main body cover 120 may be separably coupled to the accommodating unit main body 110.

Hereinafter, the configuration in which the washing water flows into the washing water inlet 122 from the water supply device 30 is described, but the present embodiment is not necessarily limited thereto, and washing water may flow directly into the washing water inlet 122 from an external water source such as a faucet through a hose.

The accommodating unit main body 110 includes the main flow path 112. The main flow path 112 communicates with the sump 20*b* through a washing water outlet 112*f* (shown in FIG. 7) and supplies washing water to the sump 20*b*. The main flow path 112 includes a hose connector 112*e* having the washing water outlet 112*f*, and a hose (not illustrated), which communicates the sump 20*b* with the washing water outlet 112*f*, and may be connected to the hose connector 112*e*. The main flow path 112 is formed so that the washing water bypasses the solution accommodating unit 111 and reaches the washing water outlet 112*f*.

The branch flow path 123 is a flow path along which a part of the washing water, which is guided along the main flow path 112 and separated from the main flow path 112, flows, and may be formed by the main body cover 120. The accommodating unit main body 110 is opened at an upper side thereof in order to input or supplement the descaling agent, and the main body cover 120 covers the opened upper side. The main body cover 120 includes a cover portion 121 (shown in FIG. 7) which covers the opened upper side of the accommodating unit main body 110. In the present exemplary embodiment, the main flow path 112 is opened at the upper side thereof, and the opened side is covered by the cover portion 121, thereby preventing washing water from overflowing to the outside of the descaling solution supply device 100*a* while the washing water is guided.

The branch flow path 123 extends upward from the cover portion 121, and may have an atmosphere communicating port 123*d* formed at an upper end thereof. The branch flow path 123 may include an upstream side branch flow path 123*a* positioned at an upstream side and a downstream side branch flow path 123*b* positioned at a downstream side, centered on the atmosphere communicating port 123*d*. The upstream side branch flow path 123*a* may be an upward guide flow path that guides upward the washing water flowing in from the main flow path 112, and the downstream side branch flow path 123*b* may be a downward guide flow path that guides downward the washing water discharged from the upstream side branch flow path 123*a*.

As illustrated in FIG. 9, an outlet 123*o* of the upstream side branch flow path 123*a* is separated from an inlet 123*i* of the downstream side branch flow path 123*b*, and an intermediate flow path 123*c*, through which the washing water discharged from the outlet 123*o* of the upstream side branch flow path 123*a* passes in the process of flowing into the inlet 123*i* of the downstream side branch flow path 123*b*, is formed between the outlet 123*o* and the inlet 123*i*. The intermediate flow path 123*c* communicates with the atmosphere through the atmosphere communicating port 123*d*. The branch flow path 123 may communicate with the atmosphere through the atmosphere communicating port 123*d* even while the washing water is supplied to the sump 20*b*. When the solution accommodating unit 111 is filled with the washing water supplied through the branch flow path 123 in a state in which the solution outlet 111*h* is closed by the solution discharge valve 130, the washing water does not flow into the solution accommodating unit 111 anymore, but flows into the water supply device 30 through the atmosphere communicating port 123*d*.

Thereafter, when the supply of washing water is shut off, the amount of washing water exceeding a height of the inlet 123*i* and the amount of washing water remaining in the upstream side branch flow path 123*a*, of the overall amount of washing water in the branch flow path 123, move downward by its own weight, reversely flow to the main flow path 112, and then flow into the sump 20*b* through the washing water outlet 112*f*. In the exemplary embodiment, the downstream side branch flow path 123*b* has the inlet 123*i* positioned at the uppermost side of the flow path, and as a result, a maximum water level in the downstream side branch flow path 123*b* is restricted to be equal to or lower than a height of the inlet 123*i* when the supply of washing water is shut off. That is, when the supply of the washing water is shut off in a state in which the solution accommodating unit 111 is filled with the washing water, a water level H2 in the downstream side branch flow path 123*b* is constantly set, and the water level maintains a constant head difference (H2−H0) with respect to a water level H0 at the solution outlet 111*h*, such that the water level is defined as a head difference maintaining water level H2.

In the exemplary embodiment, the branch flow path 123 has the atmosphere communicating port 123*d* formed at the uppermost end of the flow path, and based on the atmosphere communicating port 123*d*, the upstream side branch flow path 123*a* guides the washing water upward, and the downstream side branch flow path 123*b* guides the washing water downward, but the present invention is not necessarily limited thereto. The position of the atmosphere communicating port 123*d* may be changed as necessary within a range in which the water level in the downstream side branch flow path 123*b* maintains a constant head difference with respect to the solution outlet 111*h*.

Referring to FIG. 13, the outlet 123*o* of the upstream side branch flow path 123*a* may have a smaller cross-sectional area than the inlet 123*i* of the downstream side branch flow path 123*b*. In a case in which the area of the outlet 123*o* is equal to or greater than a predetermined proportion of the area of the inlet 123*i*, a flow rate of washing water discharged through the atmosphere communicating port 123*d* is increased. As a result, there is a problem in that washing water cannot be smoothly supplied to the solution accommodating unit 111. The area of the outlet 123*o* may be equal to or smaller than ⅒ of the area of the inlet 123*i*.

Meanwhile, the main flow path 112 may include the solution merging path U (shown in FIG. 12) into which the descaling solution discharged from the solution outlet 111*h* flows. The solution merging path U is a partial section of the main flow path 112, and when the washing water passes through the solution merging path U, the washing water flows together with the descaling solution discharged through the solution outlet 111*h*. The solution outlet 111*h* communicates with the solution merging path U, and as a result, the descaling solution is collected in the solution merging path U when the solution discharge valve 130 is opened in a state in which the washing water being guided along the main flow path 112 stops flowing, that is, in a state in which the solution merging path U is vacant, or the washing water is accommodated but does not flow in the solution merging path U.

The solution merging path U may be configured to accommodate a predetermined amount of washing water even though the supply of washing water is shut off, and to this end, the solution merging path U may include a downward guide flow path 112*c* which guides the washing water downward, and an upward guide flow path 112*d* which guides upward the washing water guided along the downward guide flow path 112c. In the exemplary embodiment, the solution merging path U is formed in a U shape, and the solution outlet 111h may be positioned in the solution merging path U, particularly, at a position where a flow direction is changed in the solution merging path U. In a state in which the supply of washing water is shut off, a water level in the solution merging path U may be determined in accordance with a position of the washing water outlet 112f.

A valve mounting port 114 in which the discharge valve 130 is mounted is communicated with the solution merging path U.

When the solution discharge valve 130 is opened in a state in which no washing water is present in the solution merging path U, the descaling solution is naturally discharged to the solution merging path U by water pressure, but when the solution discharge valve 130 is opened in a state in which washing water is present in the tub 20a at a predetermined water level, the washing water may rather reversely flow from the upward guide flow path 112d into the solution accommodating unit 111 in accordance with a water level of the washing water in the tub 20a because a section, which is defined from the upward guide flow path 112d to the tub 20a via the sump 20b, is filled with the washing water. Therefore, a water level in the tub 20a needs to be lower than the head difference maintaining water level H2 at a point of time at which the solution discharge valve 130 is opened. To this end, an outlet (not illustrated), which discharges washing water to the outside of the tub 20a, may be formed in the tub 20a at a position lower than the head difference maintaining water level H2 so that a water level in the tub 20a does not exceed the head difference maintaining water level H2. According to exemplary embodiments, a water level detecting sensor (not illustrated), which detects a water level in the tub 20a, may be provided, and in this case, the controller controls the supply of washing water so that the supply of washing water is shut off depending on the water level detected by the water level detecting sensor, thereby restricting the water level in the tub 20a to be below the head difference maintaining water level H2.

Meanwhile, when the supply of washing water is completed, in a case in which the water level H1 in the tub 20a is equal to the position of the washing water outlet 112f, the descaling solution is quantitatively discharged from the solution accommodating unit 111 to the main flow path 112 because of a pressure difference ($\Delta P = \rho \cdot g \cdot (H2-H1)$) between water pressure ($P1 = \rho \cdot g \cdot H2$, $\rho$: density of washing water, g: gravitational acceleration), which is applied by the washing water accommodated in the solution accommodating unit 111 at the solution outlet 111h (reference water level H0), and water pressure, which is applied from the outside of the solution accommodating unit 111, that is, water pressure ($P2 = \rho \cdot g \cdot H1$) which is applied because of a water level in the tub 20a. Here, there may actually be a difference in density $\rho$ of the washing water between the inside of the solution accommodating unit 111 and the inside of the upstream side guide flow path 112d, but because a very small amount of descaling agent is dissolved in the washing water, an influence of density is ignored.

Figure 14:
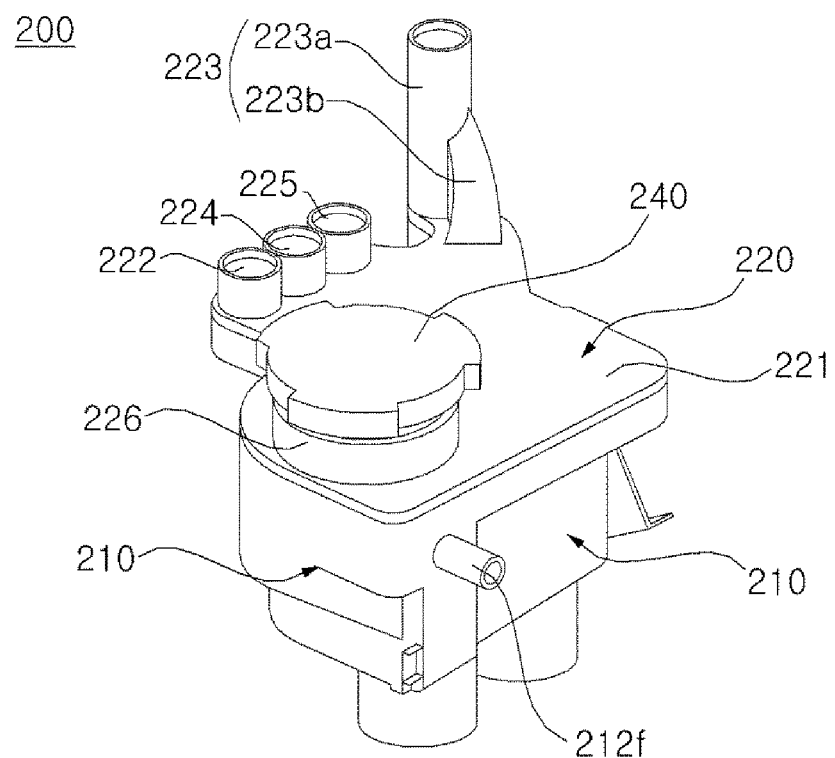
FIG. 14 is a perspective view illustrating a descaling solution supply device according to yet another exemplary embodiment of the present invention.
Figure 15:
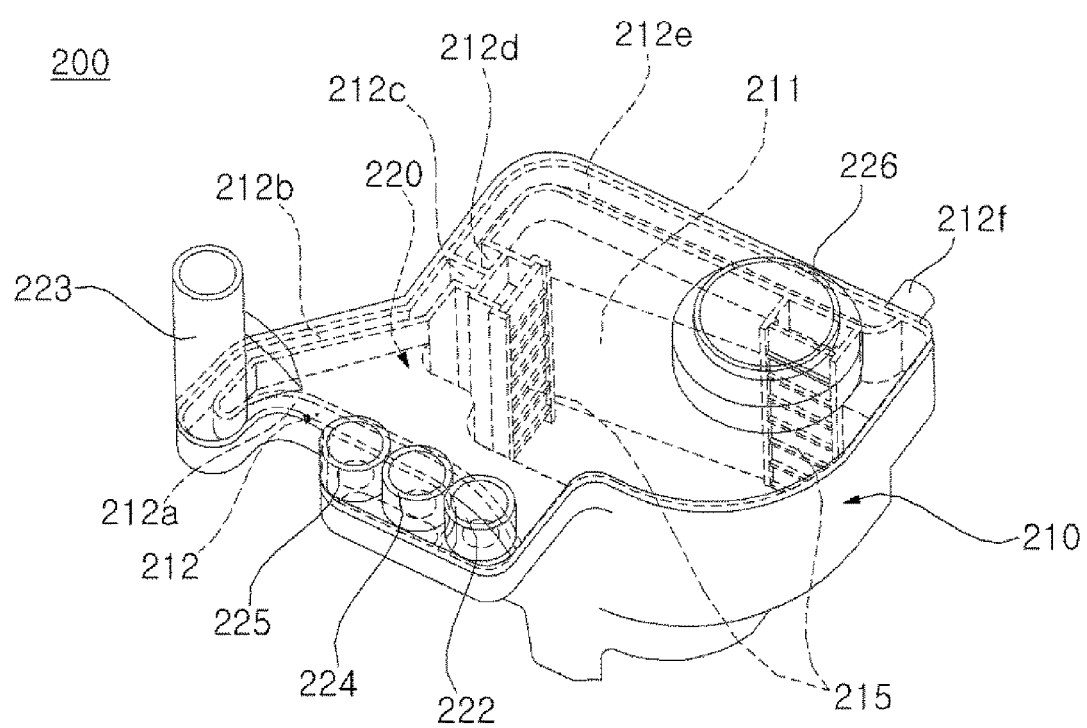
FIG. 15 is a transparent view of the descaling solution supply device illustrated in FIG. 14.
Figure 16:
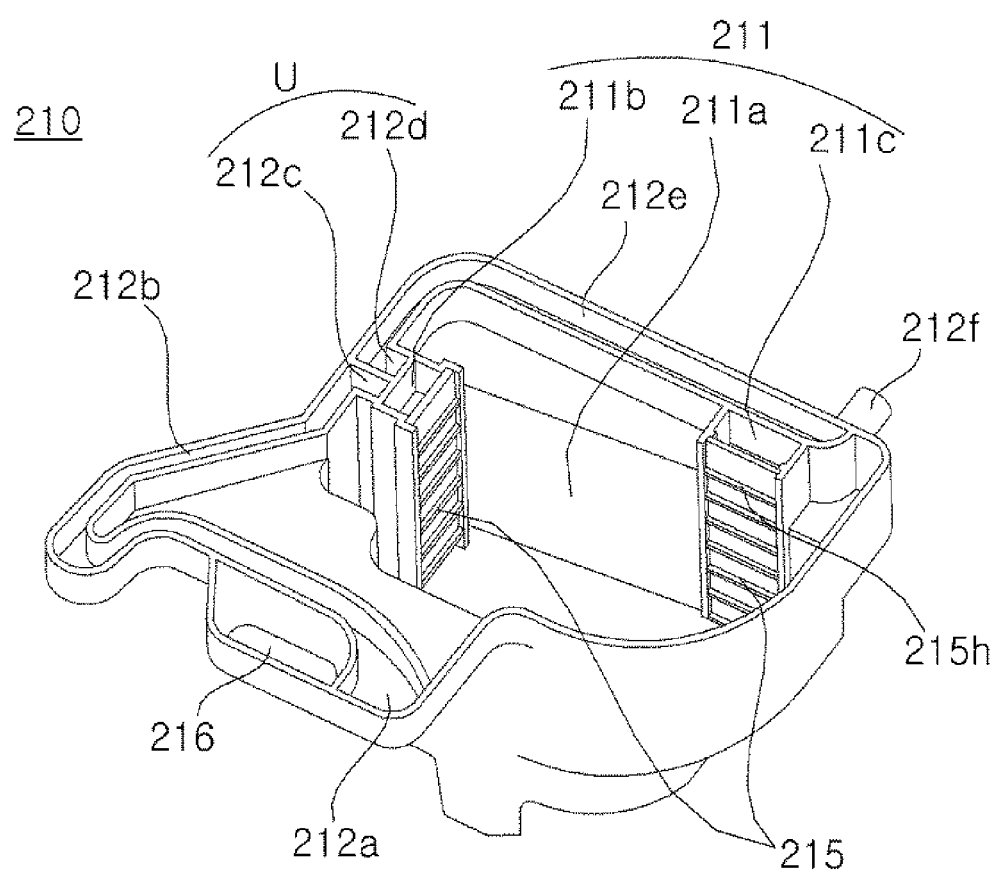
FIG. 16 is a view illustrating the inside of an accommodating unit main body illustrated in FIG. 14.
Figure 17:
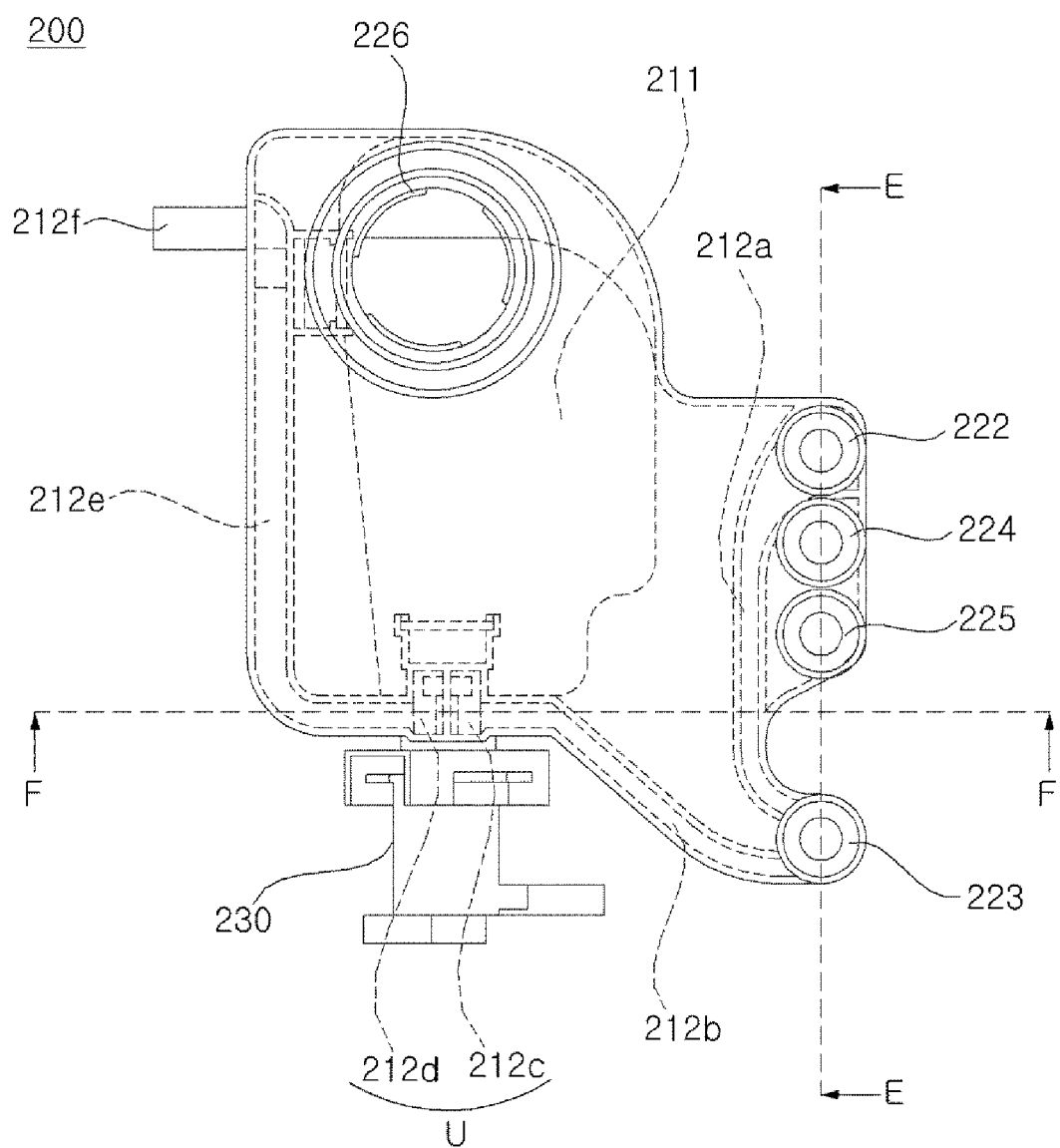
FIG. 17 is a top plan view of the descaling solution supply device illustrated in FIG. 14.
Figure 18:
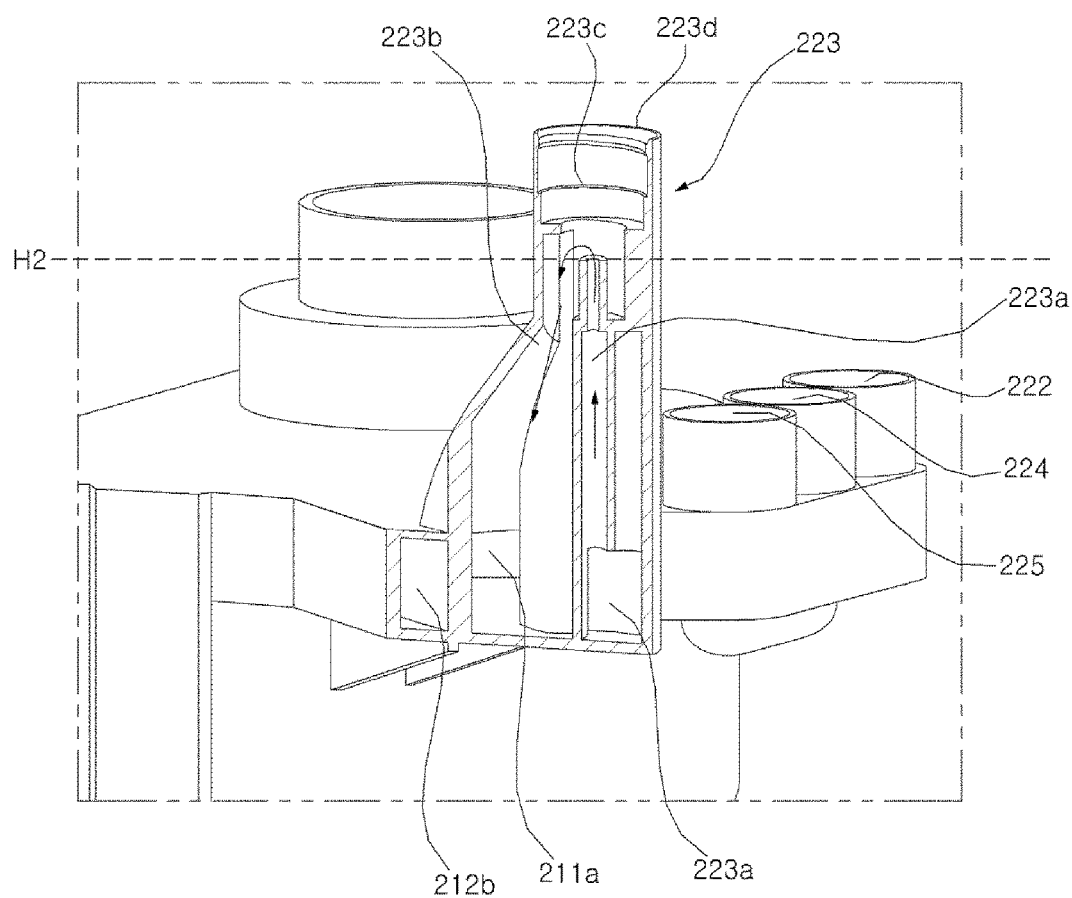
FIG. 18 is a view illustrating a longitudinal cross section of a branch flow path.
Figure 19:
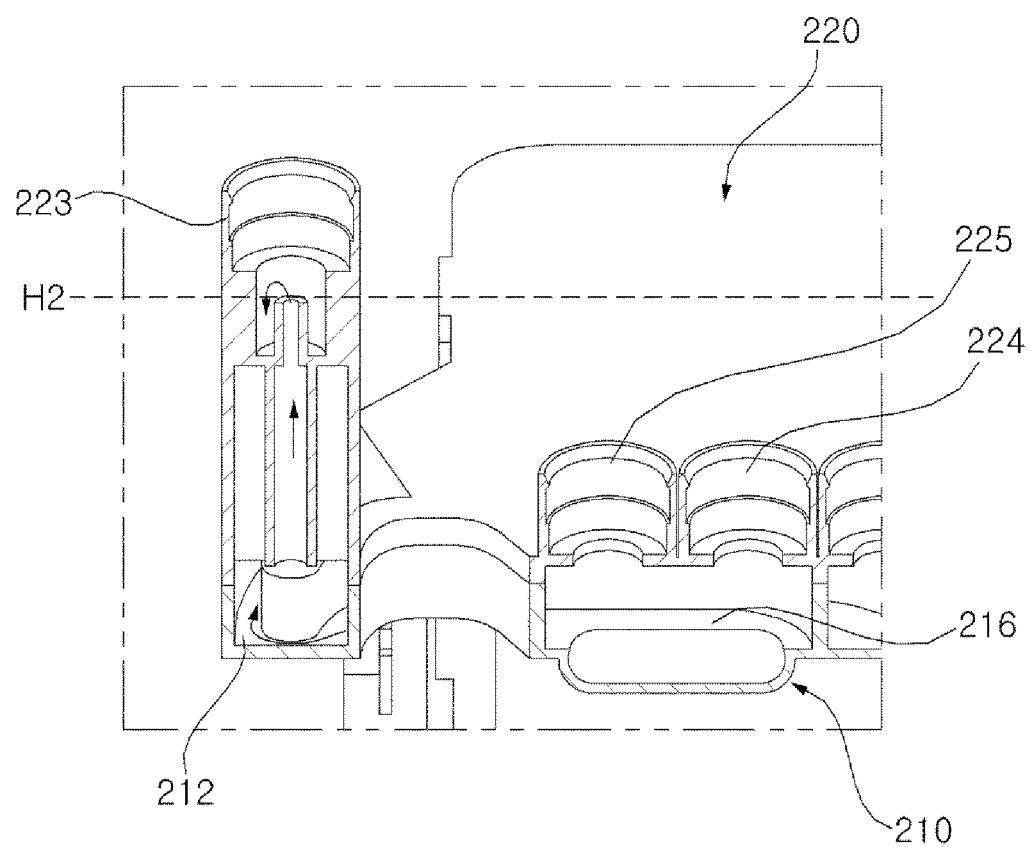
FIG. 19 is a partial cross-sectional view taken along line E-E of FIG. 17.
Figure 20:
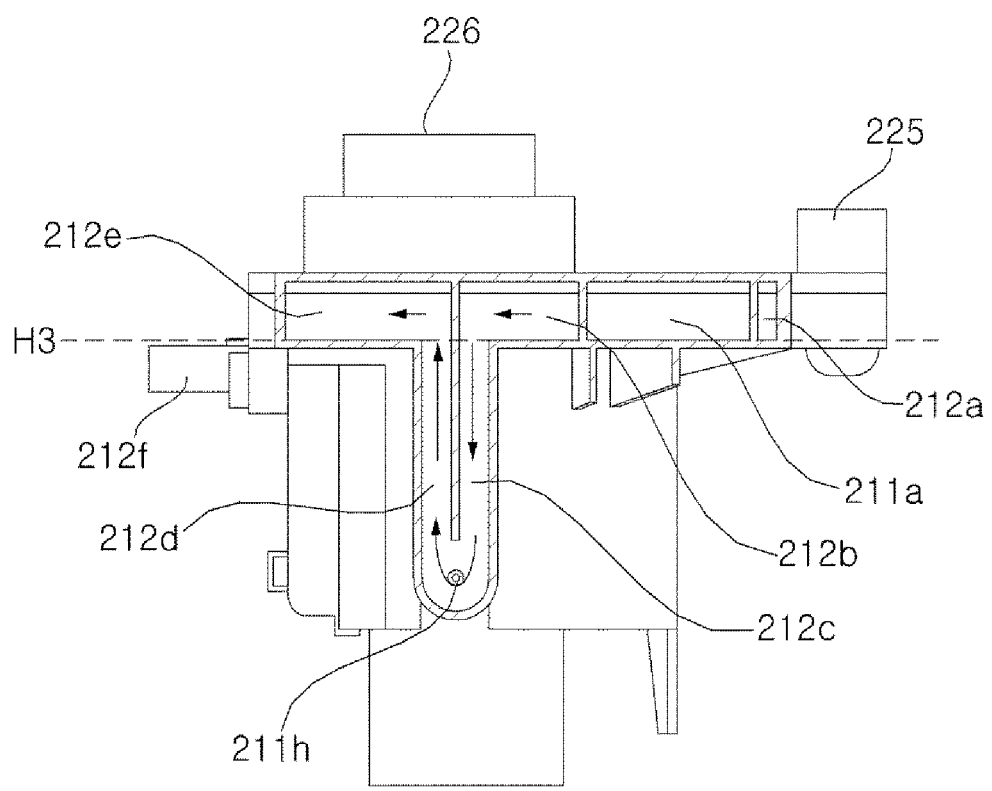
FIG. 20 is a cross-sectional view taken along line F-F of FIG. 17.

FIG. 14 is a perspective view illustrating a descaling solution supply device 200 according to a second exemplary embodiment of the present invention. FIG. 15 is a transparent view of the descaling solution supply device 200 illustrated in FIG. 14. FIG. 16 is a view illustrating the inside of an accommodating unit main body 210 illustrated in FIG. 14. FIG. 17 is a top plan view of the descaling solution supply device 200 illustrated in FIG. 14. FIG. 18 is a view illustrating a longitudinal cross section of a branch flow path 223. FIG. 19 is a partial cross-sectional view taken along line E-E of FIG. 17. FIG. 20 is a cross-sectional view taken along line F-F of FIG. 17.

Referring to FIGS. 14 to 20, the descaling solution supply device 200 according to the second exemplary embodiment of the present invention includes an accommodating unit main body 210, and a main body cover 220, and a solution discharge valve 230.

The accommodating unit main body 210 includes a solution accommodating unit 211 which accommodates a descaling solution, and a main flow path 212 which guides washing water during a process of supplying the washing water so that the washing water bypasses the solution accommodating unit 211 and is guided to a washing water outlet that communicates with a sump 20b. The washing water outlet may be formed in a hose connector 212f to which a hose (not illustrated) communicated with the sump 20b is connected. The main flow path 212 comprises a flow path 212e connecting the connector 212f with the upward guide flow path 212d.

At least one partition 215, which divides the solution accommodating unit 211 into two or more spaces, may be provided. In the exemplary embodiment, the solution accommodating unit 211 is divided, by two partitions 215, into a first accommodating unit 211a, a second accommodating unit 211b, a third accommodating unit 211c, and a descaling agent in the form of powder or particles is input into the first accommodating unit 211a, and the second accommodating unit 211b communicates with the main flow path 212 through a solution outlet 211h.

The partition 215 may have a plurality of through holes 215h so as to allow washing water to flow between the accommodating units. In the exemplary embodiment, the through hole 215h is formed in a slit shape, but the shape of the through hole 215h may of course be changed as appropriate.

A residual quantity detecting sensor (not illustrated), which detects the quantity of residual descaling agents, may be disposed in at least one of the second accommodating unit 212b and the third accommodating unit 212c. Like the aforementioned first exemplary embodiment, the controller may determine when to supplement the descaling agent based on a value detected by the residual quantity detecting sensor, and may display that it is time to supplement the descaling agent, through a display 4 or an alarm (not illustrated), so as for a user to recognize the time.

A branch flow path 223 is a flow path along which a part of the washing water, which is guided along the main flow path 212 and separated from the main flow path 212, flows, and may be formed by the main body cover 220. The main body cover 220 covers an opened upper side of the accommodating unit main body 210. The main body cover 220 may include a cover portion 221 having a descaling agent input opening 226, and the branch flow path 223 may extend upward from the cover portion 221. An atmosphere communicating port 223d may be formed at an upper end of the branch flow path 223. The branch flow path 223 may include an upstream side branch flow path 223a positioned at an upstream side and a downstream side branch flow path 223b positioned at a downstream side (shown in in FIG. 18), based on the atmosphere communicating port 223d. The upstream side branch flow path 223a may be an upward guide flow path that guides upward the washing water flowing in from the main flow path 212, and the downstream side branch flow path 223b may be a downward guide flow path that guides downward the washing water discharged from the upstream side branch flow path 223a.

As shown in FIG. 14, an input opening stopper 240, which opens and closes the descaling agent input opening 226, may be further provided. It is possible to supplement the descaling agent by opening the stopper 240 without separating the main body cover 220 from the accommodating unit main body 210.

An outlet 223o (not shown) of the upstream side branch flow path 223a is separated from an inlet 223i (not shown) of the downstream side branch flow path 223b, and an intermediate flow path 223c (shown in FIG. 18), through which the washing water discharged from the outlet 223o of the upstream side branch flow path 223a passes in the process of flowing into the inlet 223i of the downstream side branch flow path 223b, is formed between the outlet 223o and the inlet 223i. The intermediate flow path 223c communicates with the atmosphere through the atmosphere communicating port 223d. Like the aforementioned exemplary embodiment, the outlet 223o of the upstream side branch flow path 223a may have a smaller area than the inlet 223i of the downstream side branch flow path 223b.

The branch flow path 223 may communicate with the atmosphere through the atmosphere communicating port 223d even while the washing water is supplied to the sump 20b. When the washing water flows through the branch flow path 223 and then the solution accommodating unit 211 is filled with the washing water in a state in which the solution outlet 211h (shown in FIG. 20) is closed by a solution discharge valve 230, the washing water does not flow into the solution accommodating unit 211 anymore, but flows into the water supply device 30 (from FIG. 6) through the atmosphere communicating port 223d.

The main flow path 212 may include a solution merging path U into which the descaling solution discharged from the solution outlet 211h flows. The solution merging path U is a partial section of the main flow path 212, and when the washing water passes through the solution merging path U, the washing water flows together with the descaling solution discharged through the solution outlet 211h. The solution outlet 211h communicates with the solution merging path U, and as a result, the descaling solution is collected in the solution merging path U when the solution discharge valve 130 is opened in a state in which the washing water being guided along the main flow path 212 stops flowing, that is, in a state in which the solution merging path U is vacant, or the washing water is accommodated but does not flow in the solution merging path U.

The solution merging path U may be configured to accommodate a predetermined amount of washing water even though the supply of washing water is shut off, and to this end, the solution merging path U may include a downward guide flow path 212c which guides the washing water downward, and an upward guide flow path 212d which guides upward the washing water guided along the downward guide flow path 212c. In the exemplary embodiment, the solution merging path U is formed in a U shape, and the solution outlet 211h communicates with a portion of the solution merging path U where a flow direction is changed. In FIG. 20, H3 indicates a water level of washing water that remains in the solution merging path U in a state in which the supply of washing water is shut off.

The main flow path 212 may be divided into an upstream side main flow path 212a positioned at an upstream side and a downstream side main flow path 212b positioned at a downstream side, based on a portion where the main flow path 212 communicates with an inlet of the branch flow path 223. According to the aforementioned definition, the solution merging path U is included in the downstream side main flow path 212b.

The accommodating unit main body 210 includes an inlet port 222 through which washing water is introduced. The inlet port 222 may be communicated with an outlet of the water supply device 30 or connected a hose which directly supplies washing water from an external water source (e.g. water tap)

A water level in the tub 20a needs to be lower than the head difference maintaining water level H2 at a point of time at which the solution discharge valve 230 is opened. To this end, an outlet (not illustrated), which discharges washing water to the outside of the tub 20a, may be formed in the tub 20a at a position lower than the head difference maintaining water level H2 so that a water level in the tub 20a does not exceed the head difference maintaining water level H2. Like the aforementioned exemplary embodiments, a water level detecting sensor (not illustrated), which detects a water level in the tub 20a, may be provided, and in this case, the controller controls the supply of washing water so that the supply of washing water is shut off depending on the water level detected by the water level detecting sensor, thereby restricting the water level in the tub 20a to be below the head difference maintaining water level H2.

A first connector 224 and a second connector 225, which are connected with unnecessary washing water outlets provided in the water supply device 30, may be provided on the main body cover 220 for the purpose of shared use of components. A single flow in which washing water flows into any one of the first connector 224 and the second connector 225 and is discharged from the other is formed. A space 216, which has no opened portion except for the first connector 224 and the second connector 225, is formed in the accommodating unit main body 210.

According to exemplary embodiments, the water supply device 30 may further include a water softener connector (not illustrated) which is connected with a water softener so that washing water flows into the water softener, and a regenerator connector (not illustrated) which is connected with a regenerator so that washing water flows into the regenerator that regenerates the water softener. However, in a case in which the descaling solution supply device 200 is provided as described in the present exemplary embodiment, a separate water softener is not required, and as a result, the water softener connector and the regenerator connector are also not required. Therefore, the water softener connector is connected with the first connector 224, and the regenerator connector is connected with the second connector 225, so that washing water, which is discharged from the water chamber of the water supply device 30 through the water softener connector, sequentially passes through the first connector 224 and the second connector 225, and then flows back into the water chamber through the regenerator connector. The water supply device having the water softener connector and the regenerator connector may be utilized without changing a structure thereof, thereby improving shared use of components.

A process of supplying a descaling solution in the dishwasher according to the aforementioned exemplary embodiments will be described below.

In a state in which the solution outlet 111h or 211h is closed by the solution discharge valve 230, washing water is supplied through the water supply device 30. The washing water flowing along the main flow path 112 or 212 is supplied to the sump 20b through the hose connected with the hose connector 112e or 212f, pumped by the washing pump, and sprayed into the tub 20a through the nozzles 8a, 8b, and 8c. The water supply valve (not illustrated), which intermits the supply of washing water, may be provided in accordance with exemplary embodiments, and operations of the water supply valve, the washing pump and the like are controlled by the controller.

When a predetermined condition is satisfied, that is, when a water level in the tub 20a, which is detected by the water level detecting sensor, reaches a predetermined water level or when the amount of the supplied washing water detected by the flowmeter 33 reaches a predetermined amount, the controller controls the water supply valve so that the water supply valve is closed.

Thereafter, the controller opens the solution discharge valve 130 or 230 at a predetermined point of time so that the descaling solution is discharged from the solution accommodating unit 111 or 211 to the solution merging path U, and thereafter, the controller opens the water supply valve again so that the washing water is additionally supplied to the sump 20b via the solution merging path U. Here, in order to quantitatively supply the descaling solution, the operation of opening the solution discharge valve 130 or 230 may be controlled based on time. That is, the time at which the solution discharge valve 130 or 230 is opened is constantly controlled, such that the amount of descaling solution, which is supplied through the descaling solution supply device 100a or 200, may be constantly controlled all the time.

Meanwhile, the dishwasher according to the aforementioned exemplary embodiments may further include a sterilizing device (not illustrated) that sterilizes the washing water accommodated in the solution accommodating unit 111 or 211. The sterilizing device may be a device that discharges antimicrobial materials into washing water, or may include a UV lamp that emits ultraviolet rays into washing water.

Figure 21:
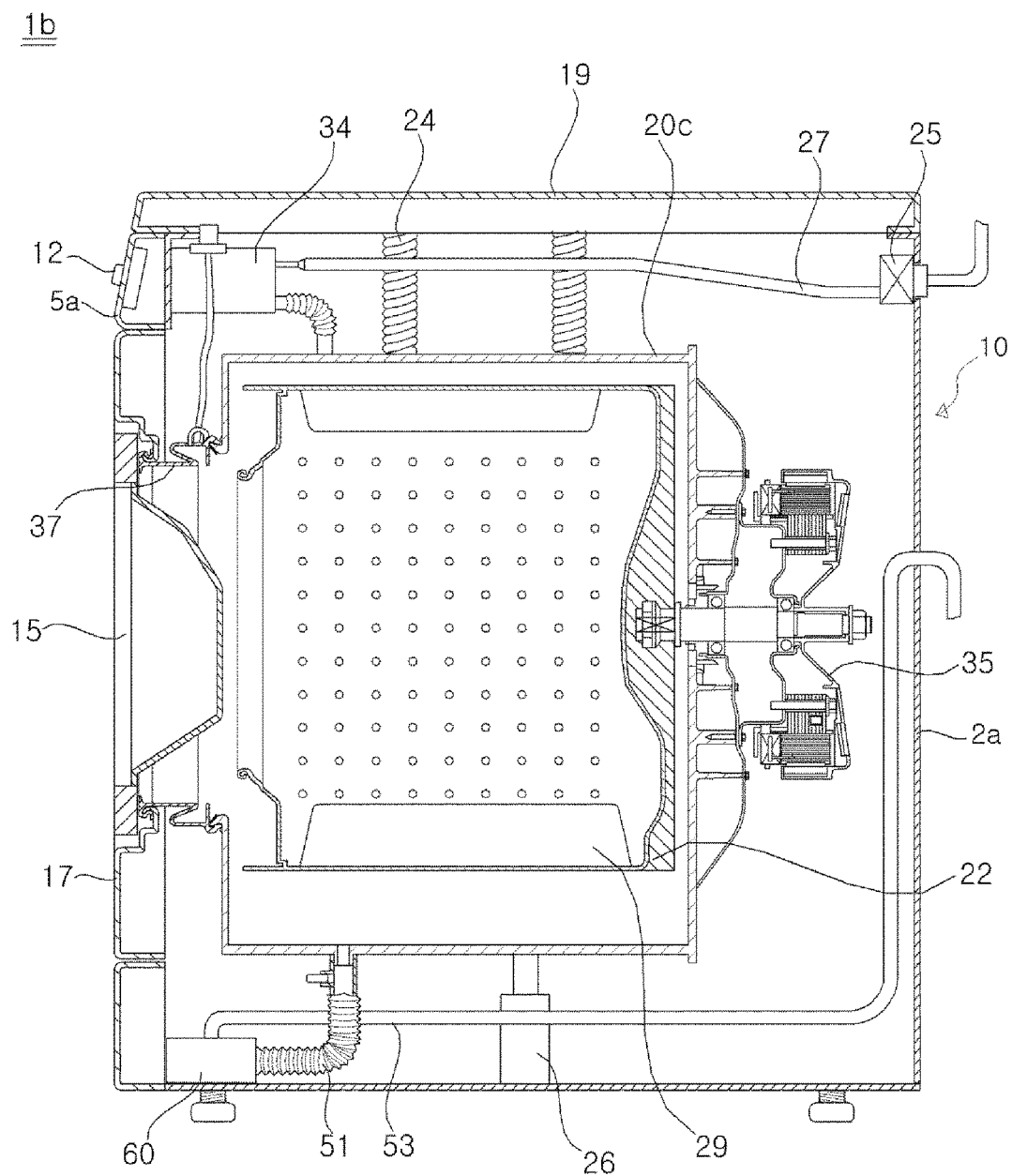
FIG. 21 is a view illustrating a laundry machine as an example of the washing machine according to an embodiment.

FIG. 21 is a view illustrating a laundry machine 1b as an example of the washing machine according to the present invention. Referring to FIG. 21, the laundry machine 1b may include a casing 10, a tub 20c which is in the casing 10 and accommodates washing water for washing laundry, a drum 22 which is disposed in tub 20c and into which laundry is inserted, and a descaling agent supply device which discharges organic acid into the washing water. The descaling agent supply device may be any one of descaling agent supply devices 100, 100a, and 200 according to the aforementioned exemplary embodiments.

In addition, the laundry machine 1b may include a drive unit 35 which rotates the drum 22, a water supply valve 25 which intermits supply of washing water from an external water source, and a tub drain hose 53 through which washing water is discharged from the tub 20c. In the present exemplary embodiment, the washing water accommodating unit 20 (see FIGS. 1 to 3) includes the tub 20c.

The casing 10 may include a cabinet 2a which defines an external appearance of the laundry machine 1b and is opened at front and upper sides, a front cover 17 which is coupled at a front side of the cabinet 2a and has a laundry entrance so as to put laundry into and take laundry out of the laundry machine, a control panel 5a which is provided at an upper side of the front cover 17 and provides a user interface, and a top cover 19 which is provided at an upper side of the cabinet 2a.

An input unit 12 (see FIG. 2), which receives various type of control commands from a user, may be provided in the control panel 5a. Various programmed courses may be selected by using the input unit 12. A controller 11 (see FIG. 2) may control overall operations of the laundry machine 1b, and may control operations of several components such as the drive unit 35 and the water supply valve 25 in accordance with the setting inputted through the input unit 12.

A gasket 37 is provided between the casing 10 and the tub 20c. The gasket 37 has a front end coupled to the casing 10, and a rear end coupled along a circumference of an opened front side of the tub 20c. Thereby, the washing water accommodated in the tub 20c is prevented from leaking between the tub 20c and the casing 10. In addition, the gasket 37 is made of flexible rubber or synthetic resin, and a circumference of the gasket 37 is folded to have pleats, thereby absorbing vibration in the tub 20c.

A door 15 for opening and closing the laundry entrance is rotatably provided on the front cover 17. The control panel 5a may be provided with a display unit (not illustrated) which displays various items of information on state of the laundry machine 1b, and the input unit 12 which receives, from the user, various types of control commands about washing courses, operating time for each process, reservation and the like.

The laundry machine 1b may include a detergent box (not illustrated) which accommodates additives such as detergents, fabric softener or bleach, and a detergent box housing 34 in which the detergent box is detachably accommodated. The detergent box may be provided to be withdrawn through the front side of the front cover 17. The detergent box housing 34 communicates with the tub 20c, and when the washing water is supplied, the detergent in the detergent box is mixed with the washing water, and then flows into the tub 20c through the detergent box housing 34.

The tub 20c is suspended from the top cover 19 by a spring 24 and supported by a damper 26. Therefore, vibration in the tub 20c is absorbed by the spring 24 and the damper 26. The drum 22 is rotated by the drive unit 35, and a lifter 29, which lifts up laundry when the drum 22 is rotated, is provided in the drum 22.

One or more water supply valves 25 are provided to intermit the supply of washing water into the tub 20c. One or more water supply hoses 27, which are connected to an external water source such as a faucet and supply washing water, may be provided, and the water supply valves 25 may intermittently control the water supply hoses 27. In addition, a distributor (not illustrated), which distributes the washing water supplied through the water supply hose 27 to the detergent box, may be further provided. Additives such as the detergent for washing laundry, a rinse for rinsing laundry, and bleach may be dividedly accommodated in the detergent box without being mixed with each other, and washing water is supplied into the respective divided accommodating spaces at a predetermined point of time through the distributor under the control of the controller 11, such that the additives may be supplied into the tub 20c.

If a route, along which the washing water flowing in through the water supply hose 27 flows until the washing water is supplied to the tub 20c, is defined as a water supply flow path, the descaling agent supply device 100, 100a, or 200 may be configured to input a descaling agent, that is, organic acid into the water supply flow path. In this case, the controller 11 may control the solution discharge valve 55, 130, or 230 so that the descaling agent may be input while the washing water is supplied through the water supply flow path.

The present invention is not limited thereto, and the descaling agent supply device 100, 100a, or 200 may input the organic acid directly into the tub 20c or the drum 22 in accordance with exemplary embodiments. In this case, the descaling agent supply device 100, 100a, or 200 may have an organic acid outlet, which communicates with the tub 20c or the drum 22, independently of the water supply flow path.

In addition, the laundry machine 1b may further include a drain bellows 51 which communicates with the tub 20c, and a drain pump 60 which pumps washing water flowing in through the drain bellows 51 to a drain hose 53.

The washing machine according to the present invention may quantitatively supply the descaling solution. Particularly, the supply of descaling solution may be constantly carried out without being affected by deviation of water supply or water supply pressure, and as a result, a required amount of descaling solution may be supplied.

In addition, the washing machine according to the present invention is very convenient because the descaling solution is automatically supplied, and the washing machine supplies a required amount of descaling solution, thereby minimizing the amount of descaling agent to be consumed, and preventing deterioration in durability of products caused by supplying an excessive amount of descaling agent.

The washing machine according to the present invention may use citric acid, malic acid, tartaric acid, acetic acid, lactic acid, formic acid, and the like as the descaling agent, and these materials are very effective in descaling, harmless to humans even if these materials remain on the object to be washed, and environmentally-friendly.

In addition, the washing machine according to the present invention is equipped with a device that automatically inputs the descaling agent, thereby avoiding the user's laborious task of manually and often cleaning the washing machine, and always keeping the washing machine clean.

What is claimed is:

1. A dishwasher comprising:
   a tub including a space in which dishes are washed;
   a sump to contain washing water to be supplied into the tub; and
   a descaling solution supply device to supply a descaling solution to the sump,
   wherein the descaling solution supply device includes:
      a main flow path to guide washing water supplied to the sump;
      a solution accommodating unit to contain a descaling agent including a solution outlet through which washing water, in which the descaling agent is dissolved, is discharged to the main flow path;
      a solution discharge valve to open and close the solution outlet; and
      a branch flow path which branches off from the main flow path, supplies the washing water into the solution accommodating unit, and includes an atmosphere communicating port that communicates with the atmosphere,
   wherein the descaling solution supply device comprises:
      an accommodating unit main body including the solution accommodating unit and the main flow path; and
      a main body cover coupled to the accommodating unit main body and forms the branch flow path,
      wherein the solution accommodating unit is open at an upper side thereof, and
      wherein the main body cover covers the upper side of the solution accommodating unit.

2. The dishwasher of claim 1, wherein the accommodating unit main body and the main body cover are separably coupled to each other.

3. A dishwasher comprising:
   a tub including a space in which dishes are washed;
   a sump to contain washing water to be supplied into the tub; and
   a descaling solution supply device to supply a descaling solution to the sump,
   wherein the descaling solution supply device includes:
      a main flow path to guide washing water supplied to the sump;
      a solution accommodating unit to contain a descaling agent including a solution outlet through which washing water, in which the descaling agent is dissolved, is discharged to the main flow path for supplying to the sump;
      a solution discharge valve to open and close the solution outlet;
      a branch flow path which branches off from the main flow path, supplies the washing water into the solution accommodating unit, and includes an atmosphere communicating port that communicates with the atmosphere;
      a water supply device to supply the washing water to the main flow path; and
      a controller that controls the water supply device to supply the washing water while the solution discharge valve is closed,
   wherein the branch flow path comprises:
      an upstream side branch flow path which guides washing water flowing upward from the main flow path; and
      a downstream side branch flow path which guides the washing water downward along the upstream side branch flow path,
      wherein a water level in the downstream side branch flow path is restricted to a predetermined height by atmospheric pressure applied through the atmosphere communicating port, and
   wherein the descaling solution supply device further comprises:
      an accommodating unit main body including the solution accommodating unit and the main flow path; and
      a main body cover coupled to the accommodating unit main body and forms the branch flow path,
      wherein the solution accommodating unit is open at an upper side thereof, and wherein the main body cover covers the upper side of the solution accommodating unit.

4. The dishwasher of claim 3, further comprising:
   an intermediate flow path through which the washing water discharged from the upstream side branch flow path passes in the process of flowing into the downstream side branch flow path,
   wherein the atmosphere communicating port is formed in the intermediate flow path.

5. The dishwasher of claim 4, wherein when the solution accommodating unit is filled with washing water, the washing water which overflows through the atmosphere communicating port into the water supply device.

6. The dishwasher of claim 4, wherein the atmosphere communicating port is exposed to the atmosphere while the washing water flows into the solution accommodating unit.

7. The dishwasher of claim 3, wherein an area of an outlet of the upstream side branch flow path is smaller than an area of an inlet of the downstream side branch flow path.

8. The dishwasher of claim 7, wherein the area of the outlet of the upstream side branch flow path is equal to or smaller than 1/10 of the area of the inlet of the downstream side branch flow path.

9. The dishwasher of claim 3, wherein the solution outlet is at a position lower than a height to which a water level in the downstream side branch flow path is restricted.

10. The dishwasher of claim 3, wherein the main flow path includes a solution merging path to guide the washing water downward and then guide the washing water upward, and wherein the solution outlet is in the solution merging path.

11. The dishwasher of claim 10, wherein a water level in the tub is restricted to be below a height to which a water level in the downstream side branch flow path is restricted.

12. The dishwasher of claim 11, wherein an outlet, through which the washing water is discharged, is in the tub at a position below the height to which the water level in the downstream side branch flow path is restricted.

13. The dishwasher of claim 3, wherein the accommodating unit main body and the main body cover are separably coupled to each other.

14. The dishwasher of claim 3, wherein a washing water inlet through which the washing water flows into the main flow path is included in the main body cover.

15. The dishwasher of claim 3, wherein a descaling agent input opening, which communicates with the solution accommodating unit, is included in the main body cover, and wherein a stopper opens and closes the descaling agent input opening.

16. The dishwasher of claim 3, further comprising:
a residual quantity detecting sensor to detect a quantity of residual descaling agents in the solution accommodating unit.

17. The dishwasher of claim 16, wherein the residual quantity detecting sensor detects a change in concentration of the descaling solution.

18. The dishwasher of claim 17, further comprising:
an information device,
wherein the controller determines when to supplement the descaling agent based on a value detected by the residual quantity detecting sensor, and controls the information device to display that it is time to supplement the descaling agent.

19. The dishwasher of claim 18, further comprising:
a partition which divides the inside of the solution accommodating unit into a space into which the descaling agent is input and a space in which the residual quantity detecting sensor is disposed,
wherein the partition has a through hole which allows the washing water to flow between the two spaces.

20. The dishwasher of claim 3, wherein the descaling agent includes organic acid in the form of particles or powder.

21. The dishwasher of claim 20, wherein the organic acid includes selected from a group consisting of citric acid, malic acid, tartaric acid, acetic acid, lactic acid, and formic acid.

22. The dishwasher of claim 3, further comprising:
a sterilizing device to sterilize washing water in the solution accommodating unit.

23. The dishwasher of claim 22, wherein the sterilizing device discharges antimicrobial materials into washing water.

24. The dishwasher of claim 22, wherein the sterilizing device emits ultraviolet rays into washing water.

25. The dishwasher of claim 3, wherein the controller is configured to control the solution discharge valve so that the solution discharge valve is opened based on the number of cycles performed including a series of processes.

26. The dishwasher of claim 3, wherein the controller is configured to control the solution discharge valve so that the solution discharge valve is opened each time a cycle including a series of processes is carried out.

27. The dishwasher of claim 3, further comprising:
an input unit to receive a predetermined course for inputting the descaling agent that is selected by a user,
wherein the controller controls the solution discharge valve so that when the predetermined course is selected by using the input unit, the solution discharge valve is opened while the predetermined course is carried out.

28. The dishwasher of claim 27, wherein the input unit provides the predetermined course separately from a washing course and a rinsing course.

29. The dishwasher of claim 3, further comprising:
a hardness sensor to detect hardness of washing water being supplied from an external water source to the descaling solution supply device,
wherein the controller sets an amount of organic acid, which is input through the descaling solution supply device, based on a value detected by the hardness sensor.

* * * * *